United States Patent
Li et al.

(10) Patent No.: US 11,082,950 B2
(45) Date of Patent: Aug. 3, 2021

(54) USER EQUIPMENT (UE) AND METHOD OF SIDELINK DATA COMMUNICATION IN FIFTH GENERATION (5G) NEW RADIO (NR) THINGS NETWORKS

(71) Applicant: Apple Inc., Cupertino, CA (US)

(72) Inventors: Qian Li, Beaverton, OR (US); Guangjie Li, Beijing (CN); Geng Wu, Portland, OR (US); Xiaoyun May Wu, Portland, OR (US); Joonbeom Kim, Carrollton, TX (US); Hassan Ghozlan, Hillsboro, OR (US); Dawei Ying, Hillsboro, OR (US); Vesh Raj Sharma Banjade, Hillsboro, OR (US); Satish Chandra Jha, Hillsboro, OR (US); Yaser M. Fouad, Hillsboro, OR (US); Lu Lu, Hillsboro, OR (US)

(73) Assignee: Apple Inc., Cu, CA (US)

( * ) Notice: Subject to any disclaimer, the term of this patent is extended or adjusted under 35 U.S.C. 154(b) by 252 days.

(21) Appl. No.: 16/078,999

(22) PCT Filed: Oct. 28, 2016

(86) PCT No.: PCT/US2016/059472
§ 371 (c)(1),
(2) Date: Aug. 22, 2018

(87) PCT Pub. No.: WO2017/146780
PCT Pub. Date: Aug. 31, 2017

(65) Prior Publication Data
US 2019/0090220 A1    Mar. 21, 2019

Related U.S. Application Data

(60) Provisional application No. 62/300,332, filed on Feb. 26, 2016, provisional application No. 62/329,047,
(Continued)

(51) Int. Cl.
*H04W 72/02* (2009.01)
*H04W 74/08* (2009.01)
(Continued)

(52) U.S. Cl.
CPC ........... *H04W 72/02* (2013.01); *H04W 8/005* (2013.01); *H04W 56/001* (2013.01);
(Continued)

(58) Field of Classification Search
CPC combination set(s) only.
See application file for complete search history.

(56) References Cited

U.S. PATENT DOCUMENTS

2014/0105191 A1   4/2014 Yang et al.
2015/0078331 A1   3/2015 Nishio et al.
(Continued)

FOREIGN PATENT DOCUMENTS

CN   104519465 A   4/2015

OTHER PUBLICATIONS

"International Application Serial No. PCT/US2016/059472, International Search Report dated Feb. 6, 2017", 3 pgs.
(Continued)

*Primary Examiner* — Andrew Lai
*Assistant Examiner* — M Mostazir Rahman
(74) *Attorney, Agent, or Firm* — Kowert Hood Munyon Rankin and Goetzel PC

(57) ABSTRACT

Embodiments of a network User Equipment (nUE), wearable User Equipment (wUE), and methods for sidelink communication are generally described herein. The nUE may transmit a control channel that allocates a subframe as either a downlink subframe or an uplink subframe for a sidelink communication between the nUE and a wearable User Equipment (wUE). When the control channel allocates the subframe as a downlink subframe, the nUE may contend
(Continued)

for access to channel resources. The contention may include transmission of a transmitter resources acquisition and sounding (TAS) channel in a physical resource block (PRB) and an attempted detection of a receiver resources acquisition and sounding (RAS) channel from the wUE in the PRB. When the control channel allocates the subframe as an uplink subframe, the wUE may contend for access to the channel resources.

20 Claims, 13 Drawing Sheets

Related U.S. Application Data filed on Apr. 28, 2016, provisional application No. 62/405,033, filed on Oct. 6, 2016.

(51) Int. Cl.
| | |
|---|---|
| *H04W 76/14* | (2018.01) |
| *H04W 8/00* | (2009.01) |
| *H04W 56/00* | (2009.01) |
| *H04W 72/04* | (2009.01) |
| *H04L 5/00* | (2006.01) |

(52) U.S. Cl.
CPC ... *H04W 72/0446* (2013.01); *H04W 74/0866* (2013.01); *H04W 76/14* (2018.02); *H04L 5/0007* (2013.01)

(56) References Cited

U.S. PATENT DOCUMENTS

| | | | | |
|---|---|---|---|---|
| 2015/0358133 | A1* | 12/2015 | Kusashima | H04L 5/1469 370/280 |
| 2017/0150330 | A1* | 5/2017 | Kim | H04W 48/16 |
| 2019/0082496 | A1* | 3/2019 | Yi | H04W 68/02 |

OTHER PUBLICATIONS

"International Application Serial No. PCT/US2016/059472, Written Opinion dated Feb. 6, 2017", 4 pgs.

Festag, Andreas, "Standards for vehicular communication—from IEEE 802.11p to 5G", (Sep. 29, 2015), 409-416 pgs.

Nardini, G, et al., "Resource allocation for network-controlled device-to-device communications in LTE-Advanced", (Jan. 12, 2016), 1-24 pgs.

"International Application Serial No. PCT US2016 059472, International Preliminary Report on Patentability dated Sep. 7, 2018", 6 pgs.

\* cited by examiner

USER EQUIPMENT (UE) AND METHOD OF SIDELINK DATA COMMUNICATION IN FIFTH GENERATION (5G) NEW RADIO (NR) THINGS NETWORKS

PRIORITY CLAIM

This application is a U.S. National Stage Filing under 35 U.S.C. 371 from International Application No. PCT/US2016/059472, filed Oct. 28, 2016 and published in English as WO 2017/146780 on Aug. 31, 2017, which claims priority to U.S. Provisional Patent Application Ser. No. 62/300,332, filed Feb. 26, 2016, U.S. Provisional Patent Application Ser. No. 62/405,033, filed Oct. 6, 2016, and U.S. Provisional Patent Application Ser. No. 62/329,047, filed Apr. 28, 2016, each of which is incorporated herein by reference in its entirety.

TECHNICAL FIELD

Embodiments pertain to wireless communications. Some embodiments relate to wireless networks, including Fifth Generation (5G) networks, 5G New Radio (NR) Things networks, 3GPP (Third Generation Partnership Project) networks, 3GPP LTE (Long Term Evolution) networks and/or 3GPP LTE-A (LTE Advanced) networks. Some embodiments relate to sidelink communication, including 5G NR Things sidelink communication. Some embodiments relate to wearable devices, including wearable User Equipment (wUE) and network UE (nUE). Some embodiments relate to data communication, including data communication as part of sidelink communication and data communication in accordance with 5G NR Things techniques.

BACKGROUND

Mobile devices may exchange data with base stations and other mobile devices for various applications, such as voice, video or other applications. In some cases, a mobile device may be designed in accordance with factors such as reduced size, complexity, cost or other factors. For instance, a wearable device may be designed by such criteria for applications such as exchanging of sensor data with other devices. In an example scenario, a large number of mobile devices, wearable devices and/or other devices located in close proximity may communicate with each other. In another example scenario, a communication may be performed between two mobile devices, one or both of which may operate while not connected to a network. In these and other scenarios, various challenges related to synchronization, coordination, data exchange and/or other operations may arise. Accordingly, there is a general need for methods and systems to enable communication in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
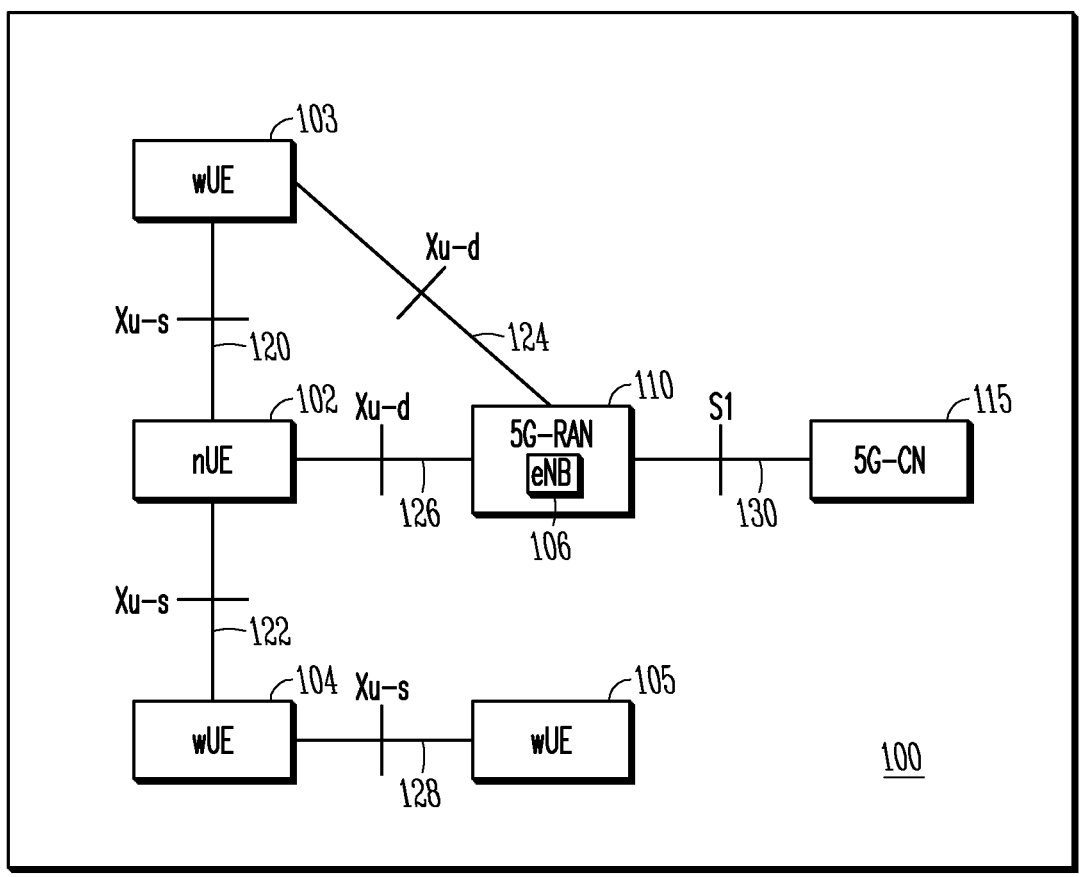
FIG. 1 is a functional diagram of a Fifth Generation (5G) New Radio (NR) Things network in accordance with some embodiments.

FIG. 1 is a functional diagram of a Fifth Generation (5G) New Radio (NR) Things network in accordance with some embodiments. It should be noted that the example 5G NR Things network 100 shown in FIG. 1 may illustrate some or all of the concepts, operations and/or techniques described herein, although the scope of embodiments is not limited by the example network 100. It should be noted that embodiments are not limited by the arrangement, ordering, type, size, number, name and/or other aspects of the components, networks, interfaces and/or other elements of the example network 100 shown in FIG. 1.

In the example 5G NR Things network 100 shown in FIG. 1, any number of network User Equipment (nUE) 102 and any number of wearable User Equipment (wUE) 103, 104, 105 may communicate with each other and/or with network components. Such network components may include, but are not limited to, the Fifth Generation (5G) radio access network (RAN) 110 and/or components of the 5G-RAN 110 (such as the Evolved Node-B (eNB) 106). The 5G-RAN 110 may communicate with the 5G core network (5G-CN) 115, in some embodiments.

As a non-limiting example, the nUE 102 may communicate with the wUE 103 over the Xu-s interface 120. The Xu-s interface 120 may be or may include a direct wireless link between the nUE 102 and the wUE 103, in some embodiments. In this case, the wUE 103 is arranged to communicate with the 5G-RAN 110 over the Xu-d interface 124, which may be a wireless link. The nUE 102 may communicate with the 5G-RAN 110 over the Xu-d interface 126, which may be a wireless link. Although the scope of embodiments is not limited in this respect, the nUE 102 may communicate with the wUE 103 as part of a sidelink communication and may communicate with the eNB 106 as part of a network communication.

In another non-limiting example, the nUE 102 may communicate with the wUE 104 over the Xu-s interface 122. The Xu-s interface 122 may be or may include a direct wireless link between the nUE 102 and the wUE 104, in some embodiments. In this case, the wUE 104 is not in communication with the 5G-RAN 110, which may be temporary, semi-permanent or permanent. As an example, the wUE 104 may be capable of communication with an nUE (such as 102) in accordance with a 5G NR Things protocol, but may be incapable of communication with an eNB (such as 106). For instance, the wUE 104 may be a device that does not include hardware/software configured for communication with a network. In another non-limiting example, two wUEs (such as 104 and 105) may be capable of communication with each other, such as over an Xu-s interface (such as 128). It should be noted that embodiments are not limited by these examples of communication between nUE 102 and/or wUEs 103-105.

In addition, reference may be made herein to exchanging of signals, messages, channels and/or other elements between the nUE 102 and the wUE 103 for convenience, but it is understood that such references do not limit the scope of embodiments to wUEs that are capable of communication with a network. For instance, such operations may be performed by the nUE 102 and a wUE 104 not necessarily in communication with the network. In addition, some operations may be performed, in some cases, by an nUE and a wUE, both of which may not necessarily be connected to a network (or even capable of communication with the network, in some cases).

It should also be noted that embodiments are not limited to wearable devices in any physical sense. In some embodiments, devices may operate in accordance with a master/slave arrangement, and one or more operations/techniques described herein may be applicable to such devices, even if those devices are not nUEs and/or wUEs. Accordingly, descriptions herein may be given without limitation in terms of an nUE (which may perform operations related to a "master" in a master/slave arrangement) and a wUE (which may perform operations related to a "slave" in the master/slave arrangement).

It should also be noted that embodiments are not limited to the example 5G NR Things network 100 shown in FIG. 1, as other cellular networks and/or other networks may be used in some embodiments. As an example, a Fifth Generation (5G) network may be used in some cases. As another example, a Third Generation Partnership Project (3GPP) network may be used in some cases. As another example, a wireless local area network (WLAN) may be used in some cases. Embodiments are not limited to these example networks, however, as other networks may be used in some embodiments. In addition, in some embodiments, one or more networks, including these example networks and/or other networks, may be used in combination. It should be noted that the networks of these embodiments and/or other embodiments may include one or more of the components shown in FIG. 1, and may include additional components and/or alternative components in some cases.

In some embodiments, nUEs 102, wUEs 103-105 and/or other devices may be configured to communicate Orthogonal Frequency Division Multiplexing (OFDM) communication signals over a multicarrier communication channel in accordance with an Orthogonal Frequency Division Multiple Access (OFDMA) communication technique and/or Orthogonal Frequency Division Multiplexing (OFDM) communication technique. OFDMA signals and/or OFDM signals may be performed in channel resources that comprise a plurality of orthogonal subcarriers, in some embodiments.

In some embodiments, a time-frequency grid, resource grid or time-frequency resource grid may describe allocation of physical resource in a subframe, slot or other time unit. Such a time-frequency plane representation is a common practice for OFDM systems, which makes it intuitive for radio resource allocation. Each column and each row of the resource grid may correspond to one OFDM symbol and one OFDM subcarrier, respectively.

In some embodiments, channel resources may comprise a number of subchannels, which may comprise a number of physical resource blocks (PRBs), which may comprise a number of subcarriers (which may be orthogonal and may be uniformly spaced). Accordingly, a number of contiguous subcarriers may be grouped into a PRB, a number of PRBs may be grouped into a subchannel. As non-limiting example, 3 contiguous subcarriers may be included in a PRB, and 6 contiguous PRBs may be included in a subchannel. Any suitable subcarrier spacing may be used, including 60 kHz or other. In some embodiments, a frame may comprise multiple subframes. As a non-limiting example, a subframe length of 0.1 milliseconds may be used, and 10 subframes may be included in a 1.0 millisecond frame.

The PRB may be a minimum allocation unit, in some embodiments. In addition, the PRB may comprise a number of subcarriers (such as 3 or other) over one subframe. A physical resource assignment (PRA) may comprise multiple PRBs. The PRA may be a minimum allocation unit, in some embodiments. A resource element (RE) may comprise one subcarrier over one OFDMA symbol period. A resource unit (RU) may comprise 3 subcarriers over 4 consecutive OFDMA symbol periods.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
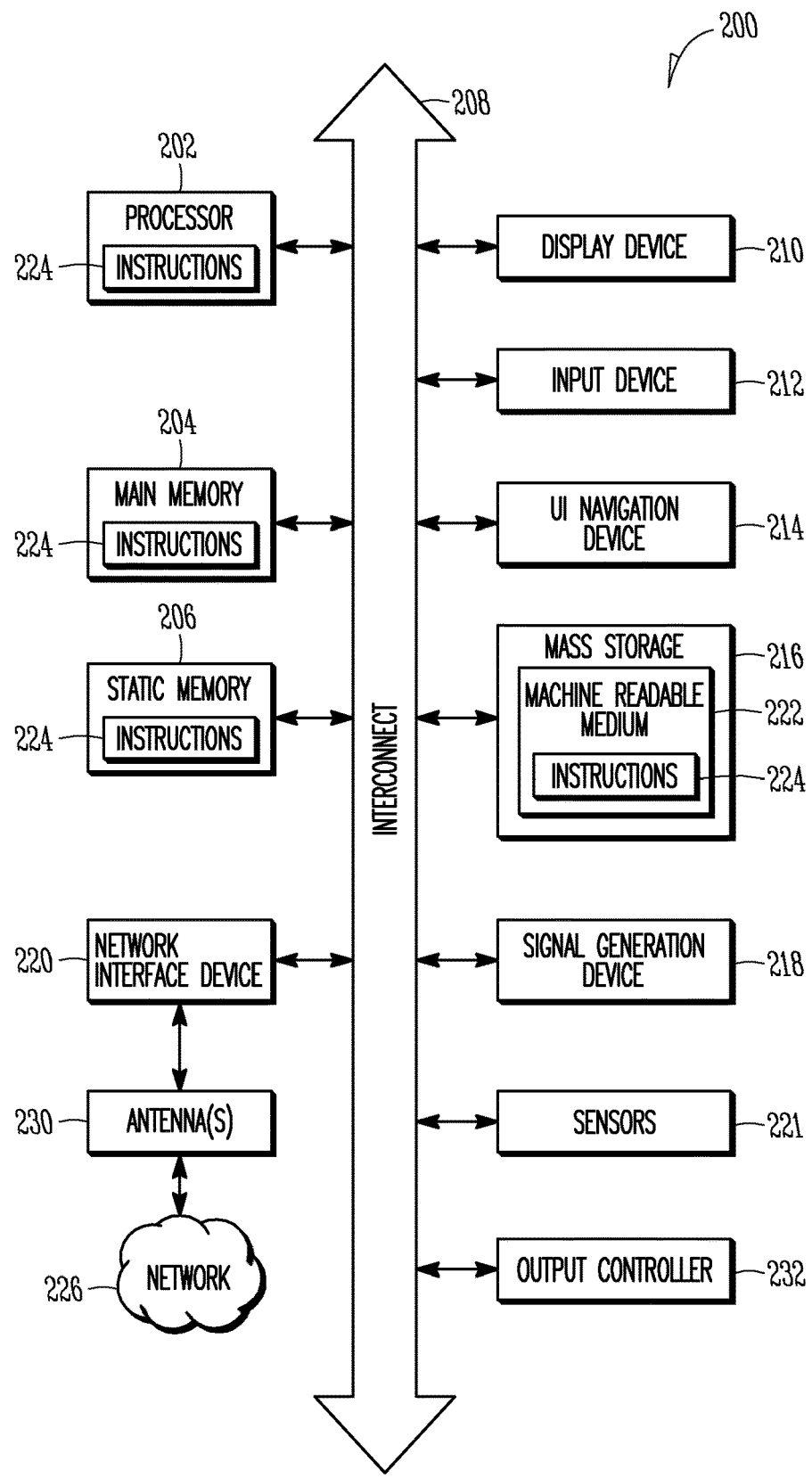
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. In a networked deployment, the machine 200 may operate in the capacity of a server machine, a client machine, or both in server-client network environments. In an example, the machine 200 may act as a peer machine in peer-to-peer (P2P) (or other distributed) network environment. The machine 200 may be an nUE 102, wUE 103-105, eNB 106, UE 1102 (FIG. 11), eNB 1104 (FIG. 11), access point (AP), station (STA), mobile device, base station, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include a display unit 210, an alphanumeric input device 212 (e.g., a keyboard), and a user interface (UI) navigation device 214 (e.g., a mouse). In an example, the display unit 210, input device 212 and UI navigation device 214 may be a touch screen display. The machine 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor. The machine 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
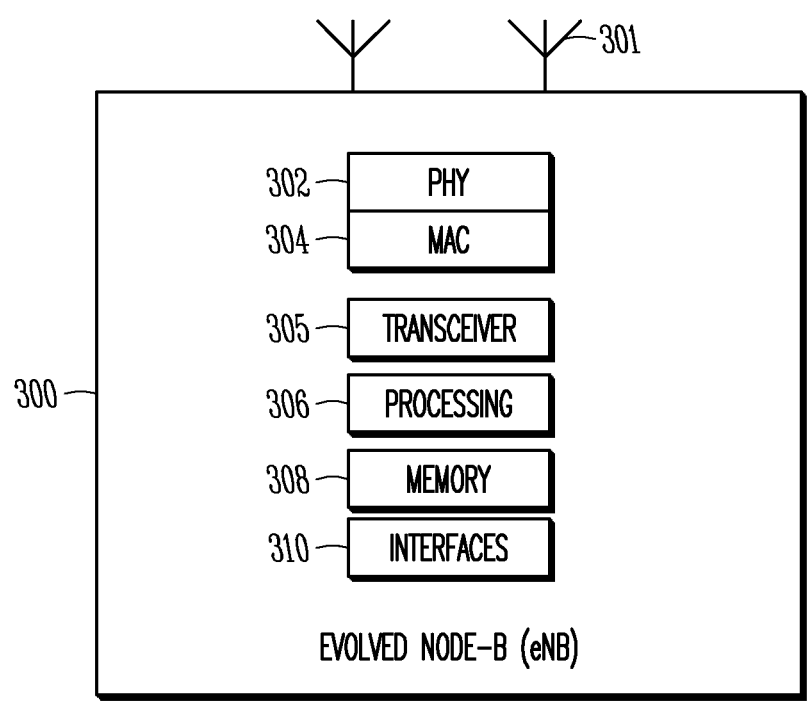
FIG. 3 is a block diagram of an Evolved Node-B (eNB) in accordance with some embodiments.
Figure 11:
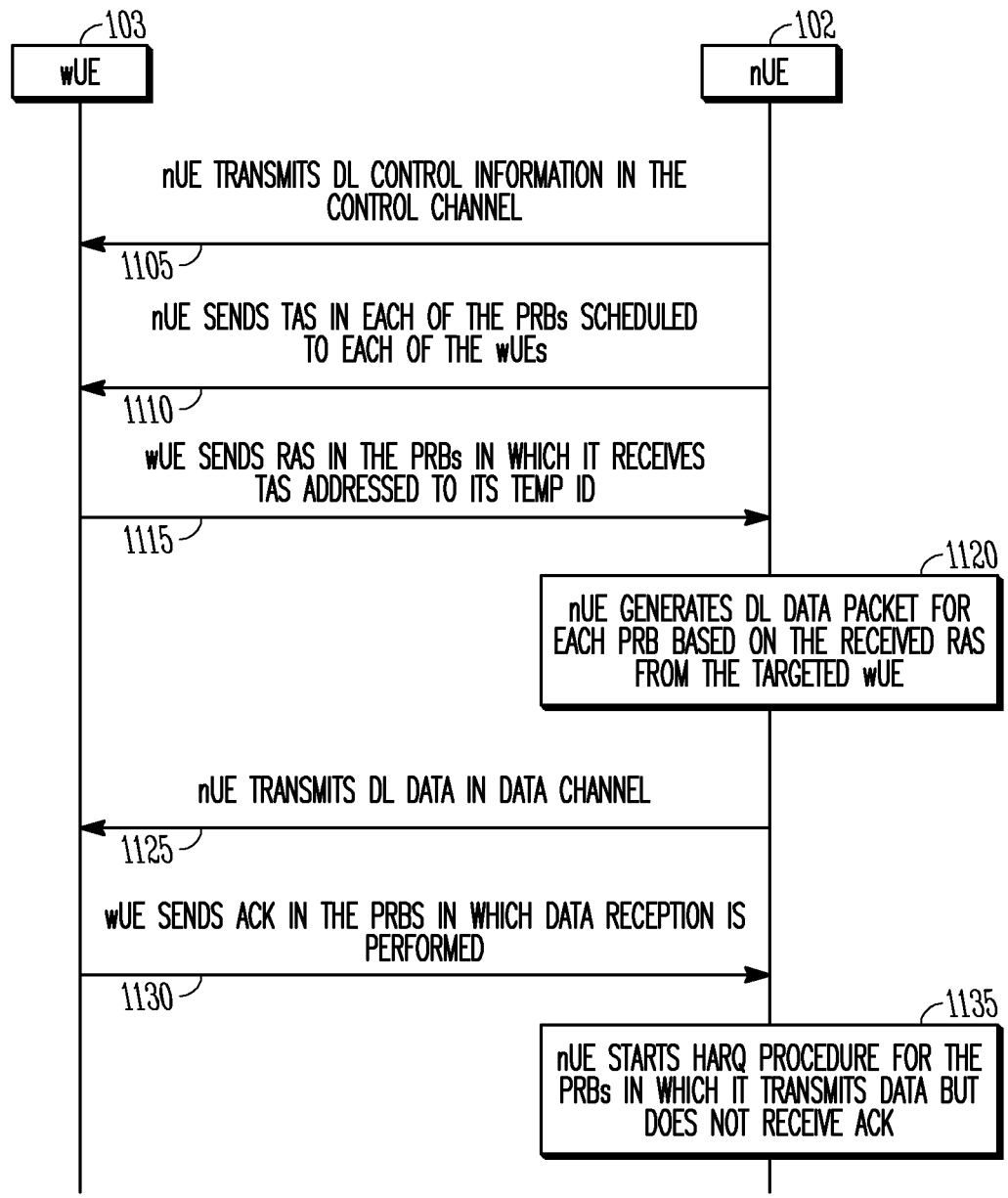
FIG. 11 illustrates example operations in accordance with some embodiments.

FIG. 3 is a block diagram of an Evolved Node-B (eNB) in accordance with some embodiments. It should be noted that in some embodiments, the eNB 300 may be a stationary non-mobile device. The eNB 300 may be suitable for use as an eNB 106 as depicted in FIG. 1, in some embodiments. The eNB 300 may be suitable for use as an eNB 1104 as depicted in FIG. 11 (to be described below), in some embodiments. It should be noted that the eNB 300 may be a legacy eNB, a 3GPP LTE eNB, a fourth generation (4G) eNB, a 5G eNB and/or other type of eNB or base station.

The eNB 300 may include physical layer circuitry 302 and a transceiver 305, one or both of which may enable transmission and reception of signals to and from an nUE (such as 102 or other), other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104, components in the 5G NR Things network 100, components in the 3GPP network 1000 (to be described below), or other network components. In addition, the interfaces 310 may enable communication with other components that may not be shown in FIG. 1 or FIG. 11, including components external to the network. As an example, the interfaces 310 may enable communication between the eNB 300 and an access point (AP) and/or other component of a WLAN. The interfaces 310 may be wired or wireless or a combination thereof. It should be noted that in some embodiments, an eNB or other base station may include some or all of the components shown in either FIG. 2 or FIG. 3 or both.

Figure 4:
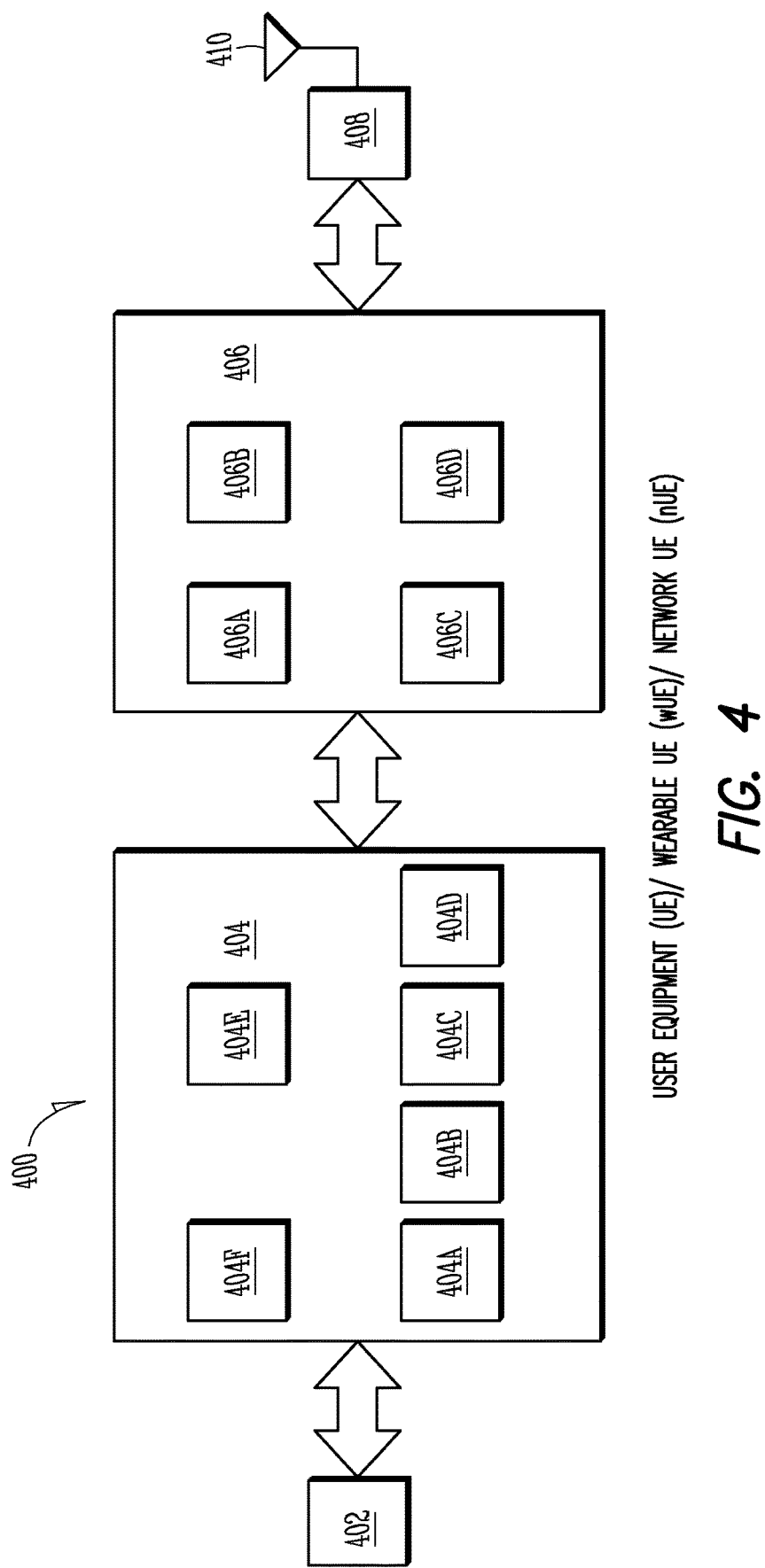
FIG. 4 is a block diagram of a User Equipment (UE) in accordance with some embodiments.

FIG. 4 is a block diagram of a User Equipment (UE) in accordance with some embodiments. The UE 400 may be suitable for use as an nUE 102 or as a wUE 103-105 as depicted in FIG. 1, in some embodiments. The UE 400 may be suitable for use as a UE 1102 as depicted in FIG. 11, in some embodiments. In some embodiments, the UE 400 may include application circuitry 402, baseband circuitry 404, Radio Frequency (RF) circuitry 406, front-end module (FEM) circuitry 408 and one or more antennas 410, coupled together at least as shown. In some embodiments, other circuitry or arrangements may include one or more elements and/or components of the application circuitry 402, the baseband circuitry 404, the RF circuitry 406 and/or the FEM circuitry 408, and may also include other elements and/or components in some cases. As an example, "processing circuitry" may include one or more elements and/or components, some or all of which may be included in the application circuitry 402 and/or the baseband circuitry 404. As another example, a "transceiver" or "transceiver circuitry" may include one or more elements and/or components, some or all of which may be included in the RF circuitry 406 and/or the FEM circuitry 408. These examples are not limiting, however, as the processing circuitry, the transceiver and/or the transceiver circuitry may also include other elements and/or components in some cases. It should be noted that in some embodiments, a UE or other mobile device may include some or all of the components shown in either FIG. 2 or FIG. 4 or both.

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 404 may include circuitry such as, but not limited to, one or more single-core or multi-core processors. The baseband circuitry 404 may include one or more baseband processors and/or control logic to process baseband signals received from a receive signal path of the RF circuitry 406 and to generate baseband signals for a transmit signal path of the RF circuitry 406. Baseband processing circuitry 404 may interface with the application circuitry 402 for generation and processing of the baseband signals and for controlling operations of the RF circuitry 406. For example, in some embodiments, the baseband circuitry 404 may include a second generation (2G) baseband processor 404a, third generation (3G) baseband processor 404b, fourth generation (4G) baseband processor 404c, and/or other baseband processor(s) 404d for other existing generations, generations in development or to be developed in the future (e.g., fifth generation (5G), 6G, etc.). The baseband circuitry 404 (e.g., one or more of baseband processors 404a-d) may handle various radio control functions that enable communication with one or more radio networks via the RF circuitry 406. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, and/or constellation mapping/demapping functionality. In some embodiments, encoding/decoding circuitry of the baseband circuitry 404 may include convolution, tail-biting convolution, turbo, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 404e of the baseband circuitry 404 may be configured to run elements of the protocol stack for signaling of the PHY, MAC, RLC, PDCP and/or RRC layers. In some embodiments, the baseband circuitry may include one or more audio digital signal processor(s) (DSP) 404f. The audio DSP(s) 404f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the RF circuitry 406 may include a receive signal path and a transmit signal path. The receive signal path of the RF circuitry 406 may include mixer circuitry 406a, amplifier circuitry 406b and filter circuitry 406c. The transmit signal path of the RF circuitry 406 may include filter circuitry 406c and mixer circuitry 406a. RF circuitry 406 may also include synthesizer circuitry 406d for synthesizing a frequency for use by the mixer circuitry 406a of the receive signal path and the transmit signal path. In some embodiments, the mixer circuitry 406a of the receive signal path may be configured to down-convert RF signals received from the FEM circuitry 408 based on the synthesized frequency provided by synthesizer circuitry 406d. The amplifier circuitry 406b may be configured to amplify the down-converted signals and the filter circuitry 406c may be a low-pass filter (LPF) or band-pass filter (BPF) configured to remove unwanted signals from the down-converted signals to generate output baseband signals. Output baseband signals may be provided to the baseband circuitry 404 for further processing. In some embodiments, the output baseband signals may be zero-frequency baseband signals, although this is not a requirement. In some embodiments, mixer circuitry 406a of the receive signal path may comprise passive mixers, although the scope of the embodiments is not limited in this respect. In some embodiments, the mixer circuitry 406a of the transmit signal path may be configured to up-convert input baseband signals based on the synthesized frequency provided by the synthesizer circuitry 406d to generate RF output signals for the FEM circuitry 408. The baseband signals may be provided by the baseband circuitry 404 and may be filtered by filter circuitry 406c. The filter circuitry 406c may include a low-pass filter (LPF), although the scope of the embodiments is not limited in this respect.

In some embodiments, the mixer circuitry 406a of the receive signal path and the mixer circuitry 406a of the transmit signal path may include two or more mixers and may be arranged for quadrature downconversion and/or upconversion respectively. In some embodiments, the mixer circuitry 406a of the receive signal path and the mixer circuitry 406a of the transmit signal path may include two or more mixers and may be arranged for image rejection (e.g., Hartley image rejection). In some embodiments, the mixer circuitry 406a of the receive signal path and the mixer circuitry 406a may be arranged for direct downconversion and/or direct upconversion, respectively. In some embodiments, the mixer circuitry 406a of the receive signal path and the mixer circuitry 406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406. In some dual-mode embodiments, a separate radio IC circuitry may be provided for processing signals for each spectrum, although the scope of the embodiments is not limited in this respect.

In some embodiments, the synthesizer circuitry 406d may be a fractional-N synthesizer or a fractional N/N+1 synthesizer, although the scope of the embodiments is not limited in this respect as other types of frequency synthesizers may be suitable. For example, synthesizer circuitry 406d may be a delta-sigma synthesizer, a frequency multiplier, or a synthesizer comprising a phase-locked loop with a frequency divider. The synthesizer circuitry 406d may be configured to synthesize an output frequency for use by the mixer circuitry 406a of the RF circuitry 406 based on a frequency input and a divider control input. In some embodiments, the synthesizer circuitry 406d may be a fractional N/N+1 synthesizer. In some embodiments, frequency input may be provided by a voltage controlled oscillator (VCO), although that is not a requirement. Divider control input may be provided by either the baseband circuitry 404 or the applications processor 402 depending on the desired output frequency. In some embodiments, a divider control input (e.g., N) may be determined from a look-up table based on a channel indicated by the applications processor 402.

Synthesizer circuitry 406d of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{Lo}$). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. FEM circuitry 408 may also include a transmit signal path which may include circuitry configured to amplify signals for transmission provided by the RF circuitry 406 for transmission by one or more of the one or more antennas 410.

In some embodiments, the FEM circuitry 408 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 406). The transmit signal path of the FEM circuitry 408 may include a power amplifier (PA) to amplify input RF signals (e.g., provided by RF circuitry 406), and one or more filters to generate RF signals for subsequent transmission (e.g., by one or more of the one or more antennas 410. In some embodiments, the UE 400 may include additional elements such as, for example, memory/storage, display, camera, sensor, and/or input/output (I/O) interface.

The antennas 230, 301, 410 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 230, 301, 410 may be effectively separated to take advantage of spatial diversity and the different channel characteristics that may result.

In some embodiments, the UE 400 and/or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 400 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 400, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 400 and the eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus for a UE, nUE or wUE may include various components of the UE 400 and/or the machine 200 as shown in FIGS. 2 and 4. Accordingly, techniques and operations described herein that refer to a UE, wUE or nUE may be applicable to an apparatus for a UE, wUE or nUE, in some embodiments. In addition, an apparatus for an eNB may include various components of the eNB 300 and/or the machine 200 as shown in FIGS. 3 and 4. Accordingly, techniques and operations described herein that refer to an eNB may be applicable to an apparatus for an eNB, in some embodiments.

In accordance with some embodiments, an nUE 102 may transmit a control channel that allocates a subframe as either a downlink subframe or an uplink subframe for a sidelink communication between the nUE 102 and a wUE 103. When the control channel allocates the subframe as a downlink subframe, the nUE 102 may transmit a transmitter resources acquisition and sounding (TAS) channel to contend for access to a physical resource block (PRB), may attempt to detect a receiver resources acquisition and sounding (RAS) channel from the wUE 103 in the PRB, and may determine whether to transmit data to the wUE 103 in the PRB based on the attempted detection of the RAS channel. When the control channel allocates the subframe as an uplink subframe, the nUE 102 may attempt to detect a TAS channel from the wUE 103 and may transmit a RAS channel to the wUE 103 in response to the TAS channel. These embodiments are described in more detail below.

In a non-limiting example scenario, a relatively high density of devices (such as nUEs 102 and/or wUEs 103) may communicate in a geographic area. Accordingly, contention based techniques may be of particular interest in this scenario. For instance, up to 1000 UEs (nUEs 102 and/or wUEs 103) may attempt to communicate in a geographic area of 10 meters by 10 meters. In this scenario, a target range of the communication may be lower than in other systems, such as cellular systems. This scenario may illustrate one possible application of the techniques and/or concepts described herein, but embodiments are not limited to this example scenario in terms of number of devices, a target range, a size of a geographic area or any other aspect.

Figure 5:
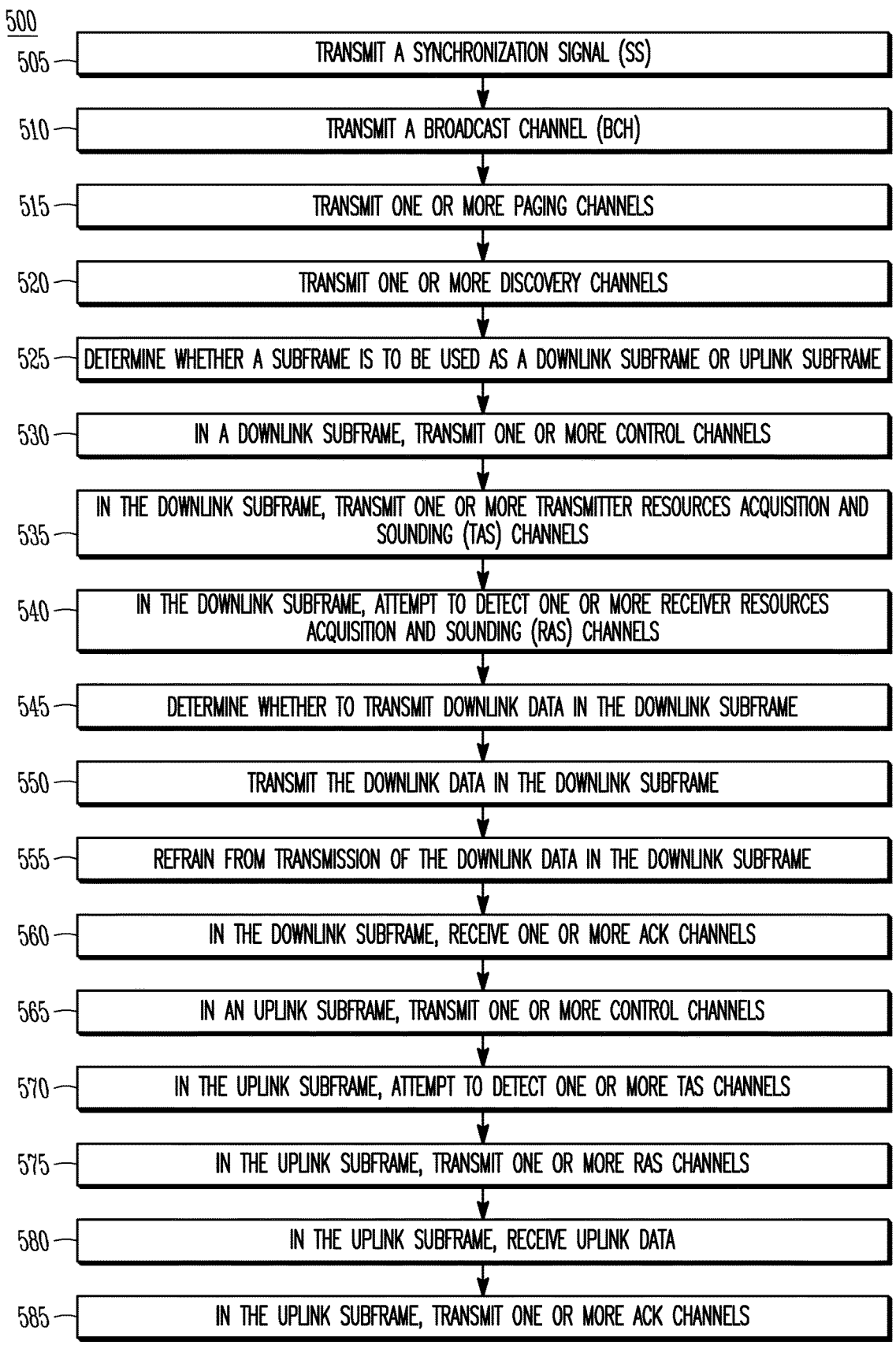
FIG. 5 illustrates the operation of a method of communication in accordance with some embodiments.

FIG. 5 illustrates the operation of a method of communication in accordance with some embodiments. It is important to note that embodiments of the method 500 may include additional or even fewer operations or processes in comparison to what is illustrated in FIG. 5. In addition, embodiments of the method 500 are not necessarily limited to the chronological order that is shown in FIG. 5. In describing the method 500, reference may be made to FIGS. 1-4 and 6-13, although it is understood that the method 500 may be practiced with any other suitable systems, interfaces and components.

In addition, while the method 500 and other methods described herein may refer to nUEs and/or wUEs operating in accordance with 5G standards, 5G NR Things standards and/or other standards, embodiments of those methods are not limited to just those devices. In some embodiments, the methods may be practiced by other devices, such as a UE, Wi-Fi access point (AP) or station (STA) or a 5G device. In some embodiments, the nUE, wUE and/or other device may be arranged to operate in accordance with multiple protocols, such as a 3GPP protocol and a 5G protocol. In addition, the method 500 and other methods described herein may be practiced by wireless devices configured to operate in other suitable types of wireless communication systems, including systems configured to operate according to various IEEE standards such as IEEE 802.11. The method 500 may also refer to an apparatus for a UE, wUE, nUE, eNB, 5G device and/or other device.

In some embodiments, one or more rules, behaviors, guidelines and/or operations of a standard, such as a 5G NR-Things standard, 3GPP standard and/or other standard, may be used. It should be noted, however, that one or more rules, behaviors, guidelines and/or operations that may not necessarily be included in a standard may be used, in some embodiments.

It should also be noted that embodiments are not limited by references herein (such as in descriptions of the methods 500, 1000 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

In some embodiments, one or more of the operations of the method 500 may be performed by the nUE 102 as part of a sidelink communication over a direct wireless link with a wearable User Equipment (wUE). The sidelink communication may be performed in channel resources comprising multiple physical resource blocks (PRBs), in some embodiments. As a non-limiting example, the PRBs may comprise multiple subcarriers of a predetermined bandwidth, which may or may not be contiguous. In some embodiments, a PRA may comprise one or more PRBs, which may or may not be contiguous. For instance, orthogonal frequency division multiplexing (OFDM) signals, orthogonal frequency division multiple access (OFDMA) signals, single-carrier frequency division multiple access (SC-FDMA) signals and/or other signals that may be based on subcarriers (orthogonal or otherwise) may be used. It should be noted that embodiments are not limited to signals, protocols, operations and/or techniques that use PRBs or subcarriers.

At operation 505, the nUE 102 may transmit one or more synchronization signals (SS). The SS(s) may enable one or more wUEs 103 to synchronize to a reference timing for the sidelink communication, in some cases. In some embodiments, the nUE 102 may determine a reference timing for the sidelink communication. As non-limiting examples, the reference timing may be based on at least one of: one or more signals exchanged with an Evolved Node-B (eNB) 106 in a network communication, one or more signals received from another nUE 102 and/or an internally generated reference timing. The frames and/or subframes of the sidelink communication may be aligned in accordance with the reference timing for the sidelink communication.

At operation 510, the nUE 102 may transmit one or more broadcast channels (BCH). The BCH may include system information, including but not limited to a system bandwidth, bandwidth of channel resources, frame number, frame index and/or other suitable information.

At operation 515, the nUE 102 may transmit one or more paging channels. As a non-limiting example, a paging channel for a particular wUE 103 may indicate that the nUE 102 intends to transmit downlink data to the wUE 103 or that the nUE 102 has received, stored and/or queued downlink data that is to be transmitted to the wUE 103. At operation 520, the nUE 102 may transmit one or more discovery channels. As a non-limiting example, the discovery channel may enable wUEs 103 to discover the nUE 103 at times such as upon wake-up, upon power-up, after a sleep period, after a power-down and/or other time. In some embodiments, common resources, overlapping resources and/or joint resources (in terms of time resources and/or channel resources) may be used for paging channels and discovery channels, although the scope of embodiments is not limited in this respect.

Figure 6:
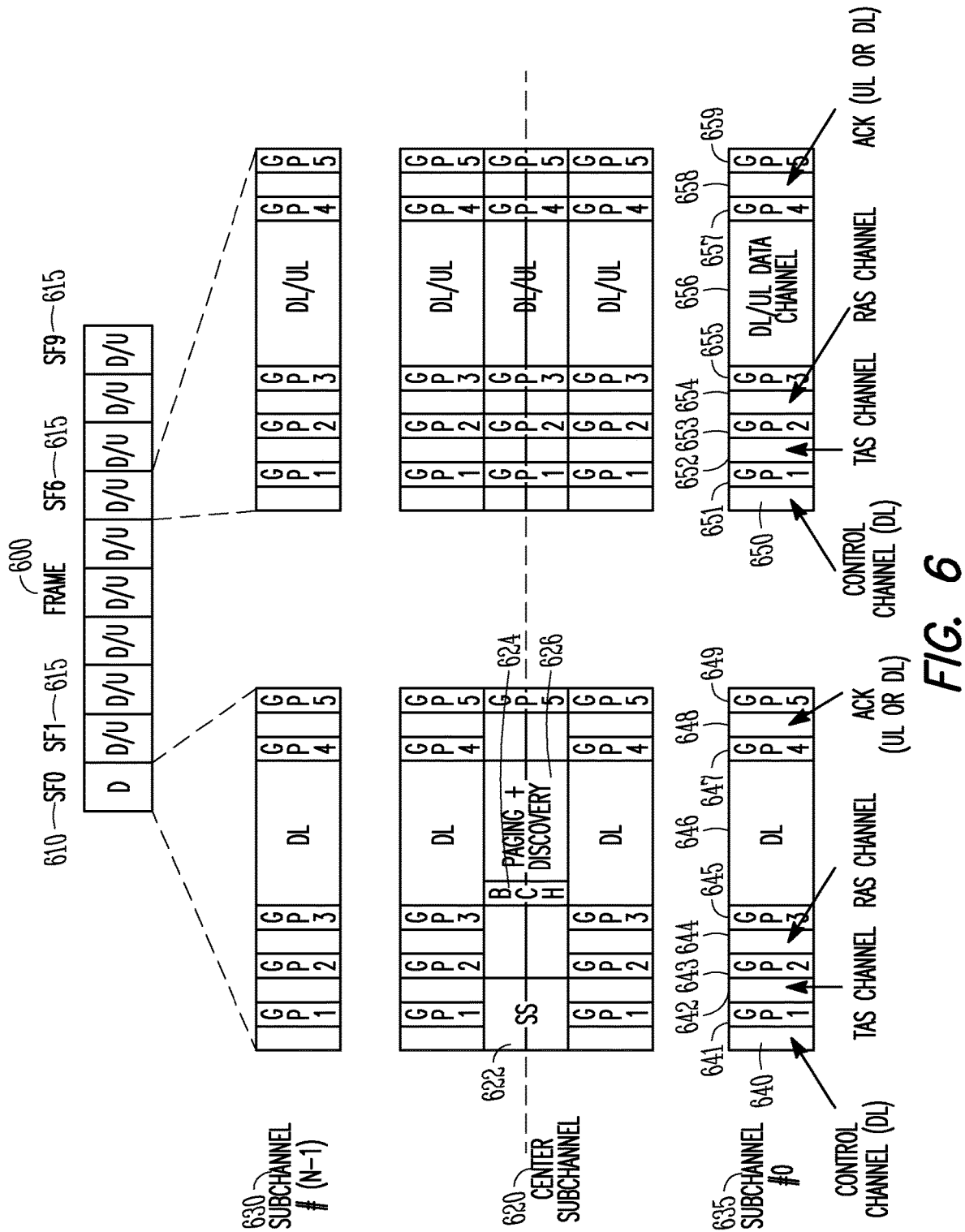
FIG. 6 illustrates examples of frames and subframes in accordance with some embodiments.
Figure 7:
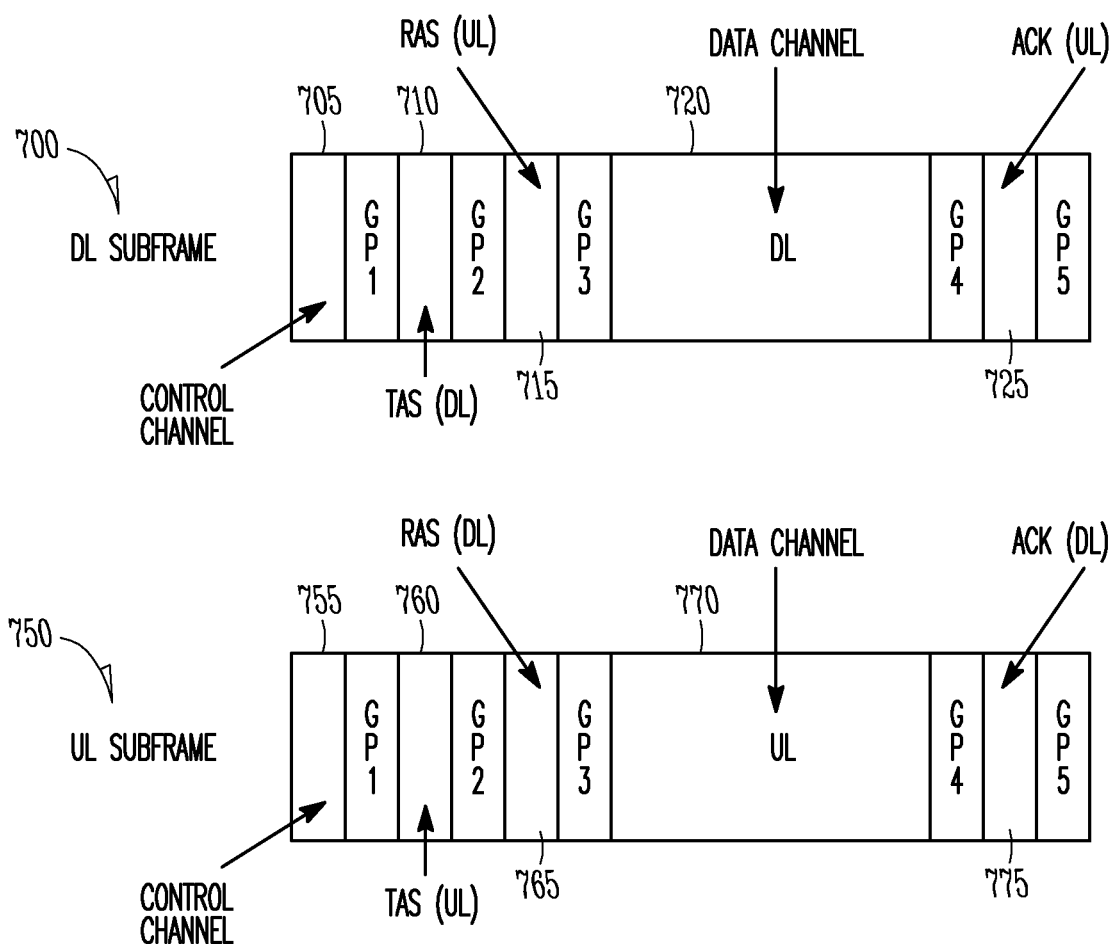
FIG. 7 illustrates additional examples of subframes in accordance with some embodiments.
Figure 8:
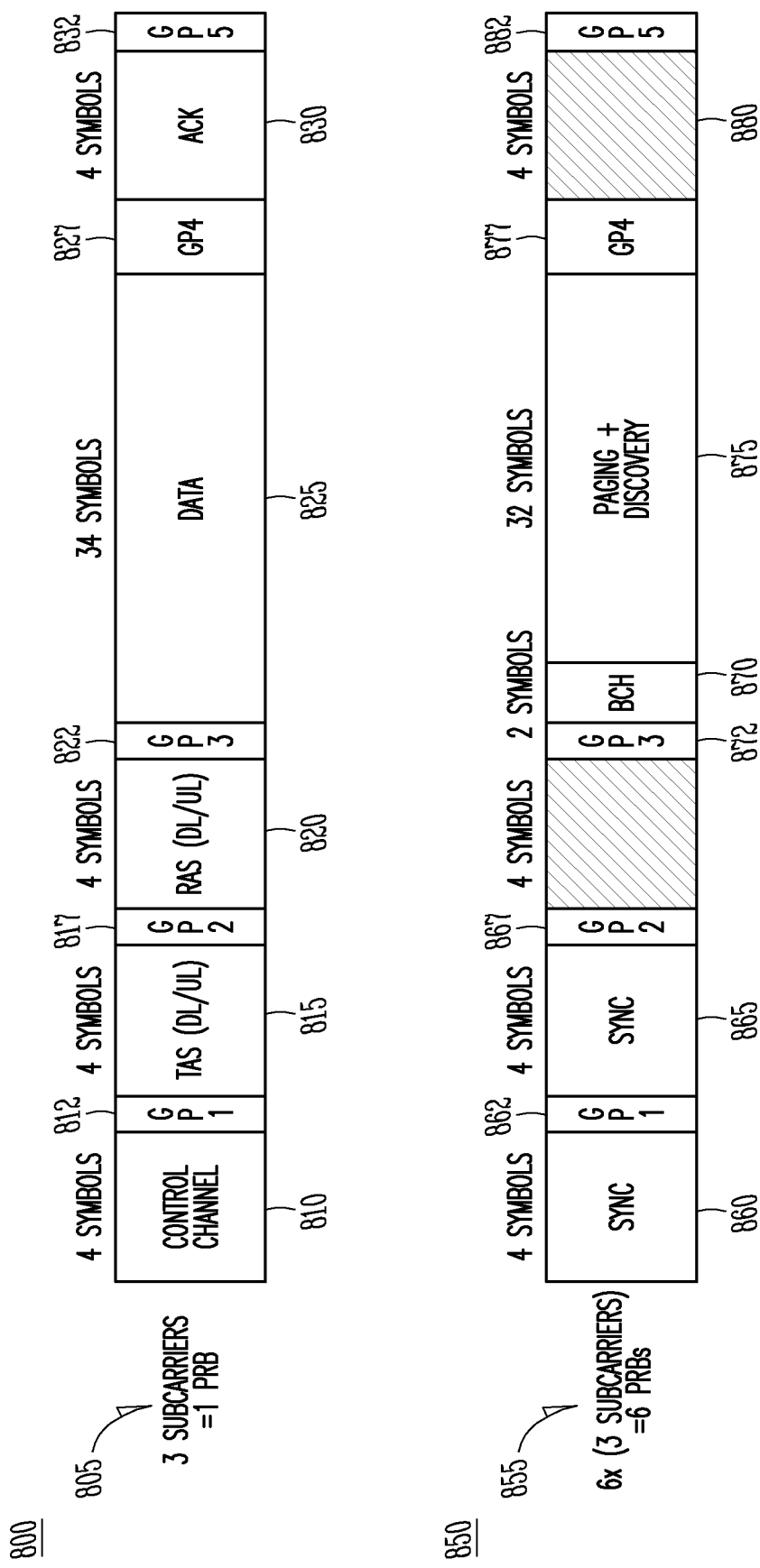
FIG. 8 illustrates additional examples of subframes in accordance with some embodiments.
Figure 9:
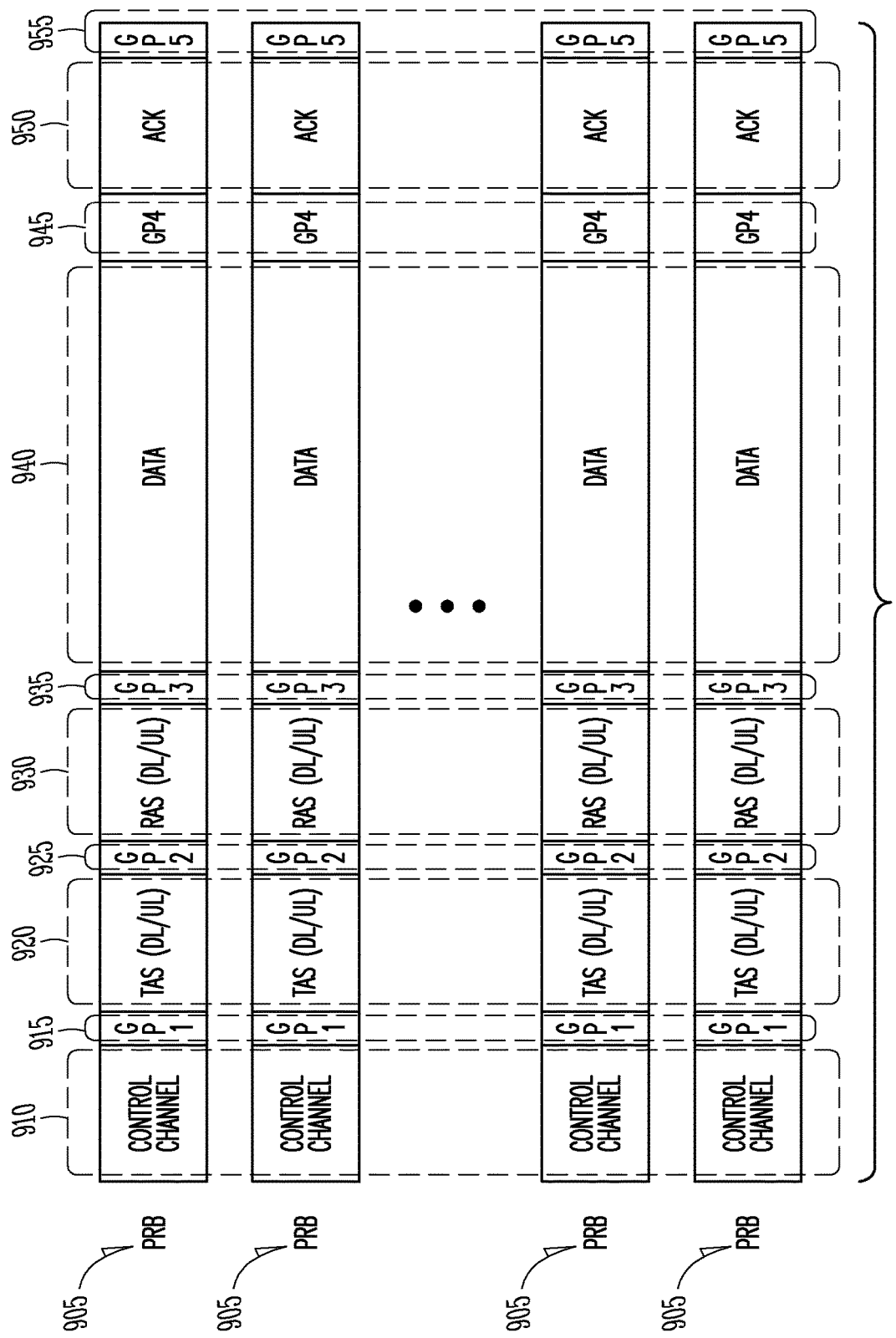
FIG. 9 illustrates additional examples of subframes in accordance with some embodiments.

FIG. 6 illustrates examples of frames and subframes in accordance with some embodiments. FIGS. 7-9 illustrate additional examples of subframes in accordance with some embodiments. It should be noted that the examples of FIGS. 6-9 may illustrate some or all of the concepts, operations and/or techniques described herein, although the scope of embodiments is not limited by the examples. It should be noted that embodiments are not limited by the arrangement, ordering, type, size, number, name and/or other aspects of the frames, channels, messages, subframes, symbol periods, time resources, subchannels, frequency resources and/or other elements of the examples shown in FIGS. 6-9.

Referring to FIG. 6, the example frame 600 comprises ten subframes, one of which is labeled as 610 and nine of which are labeled as 615. The subframe SF0 (labeled as 610) is described in more detail on the left side of FIG. 6. The subframe SF6 (one of the subframes labeled as 615) is described in more detail on the right side of FIG. 6. It should be noted that the example formats of SF0 and SF6 shown in FIG. 6 are not limiting. In a non-limiting example, subframe 610 (SF0) may be of a first format and the other subframes 615 (SF1-SF9) may be of a second format (such as the one illustrated for SF6). The scope of embodiments is not limited in this respect, however, as any suitable number of formats for the subframes (including a single format) may be used.

The channel resources of the frame 600 may include any suitable number N subchannels, which may be indexed in the range 0, 1, . . . . (N−1). In the example in FIG. 6, the center subchannel 620 may be a located at a center point of the channel resources, such as zero frequency in terms of a baseband range and/or a carrier frequency in terms of a radio frequency (RF) range. It should also be noted that the channel resources may include any suitable number of PRBs, in some embodiments. The subchannels may include any number (such as three or other) contiguous PRBs, in some cases.

The channels, messages and/or formats of the center subchannel 620 during SF0 may be different than those of the other subchannels during SF0, although the scope of embodiments is not limited in this respect. For instance, the subchannel 620 during SF0 may be used for a synchronization signal (SS) 622, broadcast channel (BCH) 624 and paging/discovery 626. Accordingly, the subchannel 620 during SF0 may be allocated for exchanging of such control information during the frame 600 in this example. However, embodiments are not limited to usage of the center subchannel 620 or to the subframe 610 (SF0) for the exchanging of such control information, as one or more other subchannels and/or subframes may be used and/or allocated for this purpose.

In a non-limiting example, the SS 622, BCH 624, and paging/discovery channels 626 may be or may include orthogonal frequency division multiple access (OFDMA) signals. The SS 622 may be transmitted in a first group of four SS OFDMA symbol periods, followed by a first guard period of one OFDMA symbol period, followed by a second group of four SS OFDMA symbol periods. The BCH may be transmitted in two OFDMA symbol periods. The paging/discovery channels may be transmitted in a group of 32 OFDMA symbol periods. Embodiments are not limited by these example numbers and/or arrangements of OFDMA symbols periods.

Returning to the method 500, at operation 525, the nUE 102 may determine whether a subframe is to be used as a downlink subframe or uplink subframe. A downlink subframe may be usable for transmission of downlink data from the nUE 102 to the wUE 103, and an uplink subframe may be usable for transmission of uplink data from the wUE 103 to the nUE 102. Data portions of the downlink subframes may be usable for transmission of downlink data from the nUE 102 to one or more wUEs 103. Data portions of the uplink subframes may be usable for transmission of uplink data from one or more wUEs 103 to the nUE 102. Accordingly, one or more operations (such as those of the methods 500 and/or 1000) may be performed for a subframe that is to be used as a downlink subframe, and one or more of those operations may not necessarily be performed for a subframe that is to be used as an uplink subframe. Similarly, one or more operations (such as those of the methods 500 and/or 1000) may be performed for a subframe that is to be used as an uplink subframe, and one or more of those operations may not necessarily be performed for a subframe that is to be used as an downlink subframe.

In some embodiments, a frame may include multiple subframes. The nUE 102 may determine, on a per-subframe basis, whether the subframes of the plurality are to be used by the nUE 102 and the wUE 103 as downlink subframes or uplink subframes. Accordingly, at least one subframe of the plurality may be flexible for usage, by the nUE 102 and the wUE 103, as a downlink subframe or an uplink subframe.

The nUE 102 may determine how many of the subframes are to be used as downlink subframes and/or uplink subframes, and may also determine which particular subframes are to be used as downlink and/or uplink subframes. Such determinations may be based on any suitable factors, including but not limited to scheduling requests from the wUEs 103, downlink data (stored, expected or otherwise) that is to be transmitted to one or more wUEs 103, uplink data (stored, expected or otherwise) that is to be received from one or more wUEs 103 and/or other factors.

It should be noted that the nUE 102 and other nUEs 102 may use the channel resources for sidelink communication, such as communication with other wUEs 103 that may not necessarily be in communication with the nUE 102. Accordingly, the nUE 102 and other nUEs 102 may decide independently whether to use a particular subframe as a downlink subframe or uplink subframe. Accordingly, it is possible that the particular subframe is used as a downlink subframe by one or more nUEs 102 and as an uplink subframe by one or more other nUEs 102.

At operation 530, the nUE 102 may transmit one or more control channels. In some embodiments, a control channel may allocate a subframe as either a downlink subframe or an uplink subframe for the sidelink communication between the nUE 102 and one or more wUEs 103. In some embodiments, a control channel transmitted in a particular subframe may indicate whether the subframe is to be used (by the nUE 102 and the wUE 103) as a downlink subframe or as an uplink subframe. The control channel may also indicate a PRB and/or subchannel to be used by the nUE 102 and/or wUE 103 for various operations, such as transmission, reception, monitoring of TAS channels, RAS channels, data, ACK channels or other. For instance, the control channel may indicate a subchannel, PRA, PRB, range of subchannels, range of PRAs and/or range of PRBs in which the wUE 103 may expect TAS channel transmissions by the nUE 102. The control channel may include a channel resource allocation parameter that indicates, in any suitable manner, one or more PRBs for which the wUE 103 and/or the nUE 102 are to contend for access. In some embodiments, the control channel may be scrambled by an identifier of the nUE 102.

In some embodiments, the control channel may be transmitted in a PRA during a control portion of the subframe. In a non-limiting example, the control portion may be allocated for transmissions, by nUEs 102, of control channels that indicate PRAs, PRBs and/or subchannels on which contention for access is to be performed. It should be noted that the PRA(s) and/or PRB(s) PRB on which a particular control channel is transmitted may not necessarily be related to PRA(s) and/or PRB(s) on which data is transmitted/received by the nUE 102. The nUE 102 may transmit one or more control channels during a particular subframe to indicate information to be used, by one or more wUEs 103, for operations during the particular subframe.

In some embodiments, during a subframe allocated for usage as a downlink subframe, the nUE 102 may transmit one or more control channels scrambled by an identifier of the nUE 102. In a non-limiting example, the nUE 102 may transmit one control channel during the subframe. In some embodiments, the nUE 102 may transmit a control channel in a PRA determined based at least partly on one or more parameters of the nUE 102 (such as an identifier of the nUE 102 and/or other parameter). Such a PRA may be referred to as a "control PRA" in some cases.

In some embodiments, during a subframe allocated for usage as an uplink subframe, the nUE 102 may transmit one or more control channels scrambled by one or more identifiers of one or more wUEs 103. In a non-limiting example, the nUE 102 may transmit a control channel for each wUE 103 that is to contend for access for uplink data transmission during the subframe. The control channel for a particular wUE 103 may be scrambled by an identifier of the particular wUE 103. In some embodiments, the nUE 102 may transmit a control channel in a PRA determined based at least partly on one or more parameters of the wUE 103 that is to contend for access (such as an identifier of the wUE 103 and/or other parameter). Such PRAs may be referred to as "control PRAs" in some cases.

Referring to FIG. 6, the control channel 640 may be transmitted in a control portion of SF0. The control channel 650 may be transmitted in a control portion of SF6. As an example, the control portion used for transmission of the control channel (such as 640 or 650) may comprise four OFDMA symbol periods. Embodiments are not limited by these example numbers and/or arrangements of OFDMA symbols periods.

Returning to the method 500, at operation 535, the nUE 102 may transmit one or more transmitter resources acquisition and sounding (TAS) channels. At operation 540, the nUE 102 may attempt to detect one or more receiver resources acquisition and sounding (RAS) channels. At operation 545, the nUE 102 may determine whether to transmit downlink data in the downlink subframe. At operation 550, the nUE 102 may transmit the downlink data in the downlink subframe. At operation 555, the nUE 102 may refrain from transmission of the downlink data in the downlink subframe. At operation 560, the nUE 102 may receive one or more ACK channels in the downlink subframe.

It should be noted that one or more of operations 530-560 may be performed during a subframe determined for usage as a downlink subframe, although the scope of embodiments is not limited in this respect. Accordingly, when the subframe is determined for usage as an uplink subframe, the operations 530-560 (or at least a portion of those operations) may not necessarily be performed, in some embodiments.

In some embodiments, when the control channel allocates the subframe as a downlink subframe, the nUE 102 may transmit, in a PRB, a transmitter resources acquisition and sounding (TAS) channel to contend for access to the PRB. It should be noted that embodiments are not limited to a single PRB, as the nUE 102 may transmit multiple TAS channels in multiple PRBs to contend for access to the multiple PRBs. The transmission of the multiple PRBs may be per-PRB transmissions, in some embodiments. As an example, a TAS channel may be transmitted in each PRB in which the nUE 102 intends to contend for access. In some cases, the access for which the nUE 102 may contend may be for multiple data transmissions to a single wUE 103. In some cases, the access for which the nUE 102 may contend may be for one or more data transmissions to each of a plurality of wUEs 103.

In some embodiments, the nUE 102 may transmit, during the TAS portion of the downlink subframe in a particular PRB, a TAS channel that indicates an intention to access the particular PRB for transmission of data to the wUE 103. For instance, the nUE 102 may intend to contend for access to the particular PRB. The TAS channel may be scrambled by an identifier of the wUE 103, although the scope of embodiments is not limited in this respect. In some embodiments, the TAS portion of the subframe may be allocated for per-PRB transmissions of TAS channels by nUEs 102 and/or wUEs 103 attempting to access the channel resources.

In a non-limiting example, the PRB and/or a subchannel that includes the PRB may be indicated to the wUE 103 by a corresponding control channel. The control channel may include information that indicates a starting point, range, size and/or other information (in terms of PRBs and/or subchannels) in which the wUE 103 may expect the nUE 102 to transmit one or more TAS channels. For instance, a range of PRBs, range of subchannels, starting PRB of a range, starting subchannel of a range, size of a range of PRBs, size of a range of subchannels may be included in the control channel. The control channel may not necessarily be transmitted in the PRB/subchannel used for the TAS channels, although the scope of embodiments is not limited in this respect.

In some embodiments, the nUE 102 may transmit a control channel. The control channel may refer to a plurality of symbols mapped to a plurality of resource elements (REs). Each RE may comprise one subcarrier over one OFDMA symbol period. The plurality of symbols may include one or more data symbols and/or control symbols. In a non-limiting example, the data symbols and/or control symbols may be based on one or more data bits, control bits, information bits and/or other bits, in some cases. The plurality of symbols may also include one or more pilot symbols, in some cases. In a non-limiting example, the control channel may include one or more data symbols, control symbols and/or pilot symbols, which may be mapped to a grid of nine subcarriers during four OFDMA symbol periods. In another non-limiting example, the control channel may include one or more data symbols, control symbols and/or pilot symbols, which may be mapped to a physical resource assignment (PRA) during four OFDMA symbol periods. The PRA may include one or more PRBs. For instance, three PRBs may be included in a PRA. Accordingly, per-PRA transmission and/or reception of the control channels may be used, although the scope of embodiments is not limited in this respect. These examples are not limiting, as the control channel may be mapped to any suitable number of OFDMA symbol periods, PRAs, PRBs, REs and/or other unit. It should be noted that descriptions herein may refer to the control channel in the context described above, but embodiments are not limited by such references. For instance, a control block, control symbols and/or other type of control element(s) may also be transmitted and/or received in some or all of the operations, techniques and/or methods described herein.

In some embodiments, the nUE 102 may send one or more TAS channels during the TAS portion in multiple PRBs to indicate (to one or more wUEs 103) intention to transmit data in the multiple PRBs. Accordingly, it is possible that multiple TAS channels are intended for a particular wUE 103. Each of the multiple TAS channels may be scrambled by the identifier of the particular wUE 103. In addition, at least one TAS channel may be intended for each of multiple wUEs 103, in some cases, and identifiers of the wUEs 103 may be used for scrambling of corresponding TAS channels.

In some embodiments, the nUE 102 may attempt to detect a RAS channel from the wUE 103 in the PRB. In some embodiments, the nUE 102 may attempt to detect, in a receiver resources acquisition and sounding (RAS) portion of the subframe in the particular PRB, a RAS channel from the wUE 102 that indicates a successful reception of the TAS channel In some embodiments, the RAS channel may be scrambled by the identifier of the wUE 103. The RAS portion may be allocated for per-PRB transmissions of RAS channels in response to TAS channels. For instance, RAS transmission may be performed by any wUEs 103 and/or nUEs 102 that may have detected a TAS channel in the PRB.

Accordingly, upon successful reception of the RAS channel, the nUE 102 may determine that a contention for access to the PRB for data transmission has been won by the nUE 102, in some embodiments. When the RAS channel is not successfully detected, the nUE 102 may determine that the channel contention has not been won, which may be due to any number of reasons. As an example, the wUE 103 may not have received the TAS channel due to transmissions of other TAS channels by other nUEs 102 and/or wUEs 103. As another example, the RAS channel may be transmitted by the wUE 103 and not received at the nUE 102.

When multiple TAS channels are transmitted by the nUE 102, the nUE 102 may attempt to detect multiple RAS channels during the RAS portion of the subframe. The RAS channels may be received from one or more wUEs 103. In some cases, multiple RAS channels from one wUE 103 may be detected, such as when multiple TAS channels on multiple PRBs are transmitted for that wUE 103.

In some embodiments, the nUE 102 and/or wUE 103 may transmit or receive a TAS channel. The TAS channel may refer to a plurality of symbols mapped to a plurality of resource elements (REs). Each RE may comprise one subcarrier over one OFDMA symbol period. The plurality of symbols may include one or more data symbols. In a non-limiting example, the data symbols may be based on one or more data bits, control bits, information bits and/or other bits, in some cases. The plurality of symbols may also include one or more pilot symbols, in some cases. In a non-limiting example, the TAS channel may include 10 data symbols and 2 pilot symbols, which may be mapped to a grid of three subchannels during four OFDMA symbol periods. In another non-limiting example, the TAS channel may include 10 data symbols and 2 pilot symbols, which may be mapped to a PRB during four OFDMA symbol periods. Accordingly, per-PRB transmission and/or reception of the TAS channels may be used, although the scope of embodiments is not limited in this respect. These examples are not limiting, as the TAS channel may be mapped to any suitable number of OFDMA symbol periods, PRBs, REs and/or other unit. It should be noted that descriptions herein may refer to the TAS channel in the context described above, but embodiments are not limited by such references. For instance, a TAS block, TAS data, TAS symbols and/or other type of TAS element(s) may also be transmitted and/or received in some or all of the operations, techniques and/or methods described herein.

In some embodiments, the nUE 102 and/or wUE 103 may transmit or receive a RAS channel. The RAS channel may refer to a plurality of symbols mapped to a plurality of resource elements (REs). Each RE may comprise one subcarrier over one OFDMA symbol period. The plurality of symbols may include one or more data symbols. In a non-limiting example, the data symbols may be based on one or more data bits, control bits, information bits and/or other bits, in some cases. The plurality of symbols may also include one or more pilot symbols, in some cases. In a non-limiting example, the RAS channel may include 10 data symbols and 2 pilot symbols, which may be mapped to a grid of three subcarriers during four OFDMA symbol periods. In another non-limiting example, the RAS channel may include 10 data symbols and 2 pilot symbols, which may be mapped to a PRB during four OFDMA symbol periods. Accordingly, per-PRB transmission and/or reception of the RAS channels may be used, although the scope of embodiments is not limited in this respect. These examples are not limiting, as the RAS channel may be mapped to any suitable number of OFDMA symbol periods, PRBs, REs and/or other unit. It should be noted that descriptions herein may refer to the RAS channel in the context described above, but embodiments are not limited by such references. For instance, a RAS block, RAS data, RAS symbols and/or other type of RAS element(s) may also be transmitted and/or received in some or all of the operations, techniques and/or methods described herein.

In some embodiments, the RAS channel from the wUE 103 may indicate a modulation and coding scheme (MCS). The MCS may be one of a candidate group of MCSs, which may be included in a 5G NR Things standard and/or other standard, although the scope of embodiments is not limited in this respect. In an example, the MCS may be a recommended MCS determined by the wUE 103 based on the reception of a TAS channel, measurement of signal quality based on a received TAS channel and/or other factor(s). Embodiments are not limited to inclusion of the MCS, however, as other information may be included in addition to or instead of the MCS. For instance, channel state information (CSI), signal quality measurement(s) and/or other information may be included. In some embodiments, the nUE 102 may perform data transmission based at least partly on the MCS and/or other information included in the RAS.

The nUE 102 may determine whether to transmit downlink data in the downlink subframe. In some embodiments, the determination may be based at least partly on attempted detections of the RAS channel(s). For instance, when a TAS channel is transmitted on a particular PRB for a particular wUE 103 and when a RAS channel is detected on the particular PRB from the wUE 103, the nUE 102 may transmit data on the particular PRB to the wUE 103. When the RAS channel is not detected on the particular PRB, the nUE 102 may refrain from transmission of the data on the particular PRB to the wUE 103.

In some embodiments, when the nUE 102 transmits multiple TAS channels on multiple PRBs, the attempted detections of the multiple RAS channels on the PRBs may be used by the nUE 102 to determine whether to transmit data on the PRBs. The determination may be performed per PRB, in some embodiments. For instance, the nUE may transmit a first TAS channel on a first PRB and a second TAS channel on a second PRB (to a same wUE 103 or to different wUEs 103). An attempted detection of a first RAS channel on a first PRB may be used to determine whether the nUE 102 is to transmit data on the first PRB. An attempted detection of a second RAS channel on a second PRB may be used to determine whether the nUE 102 is to transmit data on the second PRB.

The nUE 102 may transmit data on one or more PRAs and/or one or more PRBs. In some embodiments, the data may be transmitted during a data portion of the subframe that is allocated for per-PRA and/or per-PRB transmissions of data based on receptions of the RAS channels, although the scope of embodiments is not limited in this respect. In an example, the data may be transmitted on PRBs for which the nUE 102 successfully detects RAS channels and/or determines that a contention for access has been won. The nUE 102 may refrain from transmission of data on PRBs for which RAS channels are not successfully detected and/or on which a contention for access has been lost.

In some embodiments, the transmitted data and/or received data may refer to a plurality of symbols mapped to a plurality of resource elements (REs). Each RE may comprise one subcarrier over one OFDMA symbol period. The plurality of symbols may include one or more data symbols and/or control symbols. In a non-limiting example, the data symbols and/or control symbols may be based on one or more data bits, control bits, information bits and/or other bits, in some cases. The plurality of symbols may also include one or more pilot symbols, in some cases. In a non-limiting example, the plurality of symbols may be mapped to any suitable number of REs, PRBs, PRAs and/or other unit in the frequency domain, and may be mapped to any number of OFDMA symbol periods and/or other unit in the time domain. In some embodiments, per-PRA transmission and/or reception of data may be used, in which an integer number of PRAs are used, contended for and/or allocated for the data. The scope of embodiments is not limited in this respect, however. It should be noted that descriptions herein may refer to the data in the context described above, but embodiments are not limited by such references. Other suitable allocations, techniques and/or units may be used in some or all of the operations, techniques and/or methods described herein.

The nUE 102 may receive one or more acknowledgement (ACK) bits, ACK channels, ACK messages or other indicators of whether the data (and/or packets, frames or other portions of the data) is successfully received by the wUE(s) 103. The ACK bits, ACK channels, ACK messages or other indicators may be received during an ACK portion of the subframe, although the scope of embodiments is not limited in this respect. The subframe may comprise the ACK portion for per-PRB transmissions of ACK channels, wherein an ACK channel in the particular PRB includes an ACK indicator for the data transmission in the particular PRB.

In some embodiments, the nUE 102 and/or wUE 103 may transmit or receive an ACK channel. The ACK channel may refer to a plurality of symbols mapped to a plurality of resource elements (REs). Each RE may comprise one subcarrier over one OFDMA symbol period. The plurality of symbols may include one or more data symbols. In a non-limiting example, the data symbols may be based on one or more data bits, control bits, information bits and/or other bits, in some cases. The plurality of symbols may also include one or more pilot symbols, in some cases. In a non-limiting example, the ACK channel may include 10 data symbols and 2 pilot symbols, which may be mapped to a grid of three subcarriers during four OFDMA symbol periods. In another non-limiting example, the ACK channel may include 10 data symbols and 2 pilot symbols, which may be mapped to a PRB during four OFDMA symbol periods. Accordingly, per-PRB transmission and/or reception of the ACK channels may be used, although the scope of embodiments is not limited in this respect. These examples are not limiting, as the ACK channel may be mapped to any suitable number of OFDMA symbol periods, PRBs, REs and/or other unit. It should be noted that descriptions herein may refer to the ACK channel in the context described above, but embodiments are not limited by such references. For instance, an ACK block, ACK data, ACK symbols and/or other type of ACK element(s) may also be transmitted and/or received in some or all of the operations, techniques and/or methods described herein.

In some embodiments, at least one of the PRBs of the channel resources may be configurable for one or more TAS channels from contending nUEs 102 and/or wUEs 103, corresponding RAS channels, corresponding data transmissions and/or corresponding ACK channels.

As previously described, the nUE 102 may determine that a subframe is to be used as a downlink subframe or as an uplink subframe. When it is determined that a subframe is to be used as an uplink subframe, the nUE 102 may perform one or more of operations 565-585, although the scope of embodiments is not limited in this respect. Accordingly, when it is determined that the subframe is to be used as a downlink subframe, the nUE 102 may refrain from performance of operations 565-585 (or at least a portion of those operations), in some embodiments.

At operation 565, the nUE 102 may transmit one or more control channels. The control channels may be similar to those transmitted at operation 530, although the scope of embodiments is not limited in this respect. The control channels may indicate that the subframe is to be used as an uplink subframe. The control channel may also include information such as previously described and/or other information. For instance, the control channel may indicate a subchannel, PRB, range of subchannels and/or range of PRBs in which the wUE 103 may perform TAS channel transmissions to contend for access for uplink data transmissions. The control channel may be scrambled by the identifier of the nUE 102, although the scope of embodiments is not limited in this respect.

At operation 570, the nUE 102 may attempt to detect one or more TAS channels in one or more of the PRBs of the channel resources during the TAS portion of the subframe. The TAS channels may indicate intention by one or more wUEs 103 to transmit uplink data in the one or more PRBs. At operation 575, the nUE 102 may transmit one or more RAS channels during the RAS portion of the subframe based on the attempted detection of the TAS channels during the TAS portion of the subframe. For instance, when a TAS channel is successfully detected on a particular PRB, the nUE 102 may transmit a corresponding RAS channel on the particular PRB. When the attempted detection of the TAS channel on the particular PRB is not successful, the nUE 102 may refrain from transmission of a corresponding RAS channel on the particular PRB.

In some embodiments, a TAS channel received from a particular wUE 103 may be scrambled by an identifier of the particular wUE 103. In addition, a RAS channel transmitted to a particular wUE 103 may be scrambled by the identifier of the particular wUE 103.

At operation 580, the nUE may receive uplink data on one or more PRAs and/or one or more PRBs. For instance, for the PRB(s) on which RAS channel(s) are successfully received, the nUE 102 may attempt to receive uplink data on those PRBs (and/or PRAs including those PRBs) during the data portion of the subframe. At operation 585, the nUE may transmit ACK bits, ACK channels and/or ACK messages during the ACK portion of the subframe based on the attempted receptions of uplink data. For instance, an ACK bit, ACK channel and/or ACK message may be transmitted on a particular PRB to indicate reception information for the uplink data received (or attempted) on the particular PRB and/or PRA that includes the particular PRB. In addition, per-PRB transmissions of multiple ACK bits, ACK channels and/or ACK messages may be performed for corresponding uplink data.

In a non-limiting example, in a downlink subframe, the nUE 102 may contend for access to a PRA to transmit downlink data to a wUE 103. The PRA may include multiple PRBs. The nUE 102 may send a TAS channel on one or more of the PRBs of the PRA (in some cases, on all the PRBs of the PRA). The TAS channel may be duplicated on one or more of the PRAs, although the scope of embodiments is not limited in this respect. The nUE 102 may monitor one or more of the PRBs of the PRA to attempt detection of a RAS channel In some cases, if a RAS channel is successfully detected on at least one of the monitored PRBs, the nUE 102 may transmit downlink data to the wUE 103 on the PRA (that is, on all the PRBs of the PRA). Any suitable arrangement for the downlink data may be used, such as distribution across multiple PRBs, repetition on multiple PRBs and/or other. The nUE 102 may monitor one or more of the PRBs of the PRA to detect an ACK channel. The ACK channel may include ACK information for the data on the PRA, individual ACK information for each PRB and/or other. Related operations may be performed by the wUE 103, such as monitoring for the TAS channel(s) on one or more PRBs of the PRA, transmission of the RAS channel(s) on one or more PRBs of the PRA, reception of the downlink data on one or more PRBs of the PRA, transmission of the ACK channel(s) on one or more PRBs of the PRA and/or other operation(s).

Continuing the above example, in an uplink subframe, the wUE 103 may contend for access to a PRA to transmit uplink data to the nUE 102. The PRA may include multiple PRBs. The wUE 103 may send a TAS channel on one or more of the PRBs of the PRA (in some cases, on all the PRBs of the PRA). The TAS channel may be duplicated on one or more of the PRAs, although the scope of embodiments is not limited in this respect. The wUE 103 may monitor one or more of the PRBs of the PRA to attempt detection of a RAS channel In some cases, if a RAS channel is successfully detected on at least one of the monitored PRBs, the wUE 102 may transmit uplink data to the nUE 103 on the PRA (that is, on all the PRBs of the PRA). Any suitable arrangement for the uplink data may be used, such as distribution across multiple PRBs, repetition on multiple PRBs and/or other. The wUE 103 may monitor one or more of the PRBs of the PRA to detect an ACK channel. The ACK channel may include ACK information for the data on the PRA, individual ACK information for each PRB and/or other. Related operations may be performed by the nUE 102, such as monitoring for the TAS channel(s) on one or more PRBs of the PRA, transmission of the RAS channel(s) on one or more PRBs of the PRA, reception of the uplink data on one or more PRBs of the PRA, transmission of the ACK channel(s) on one or more PRBs of the PRA and/or other operation(s).

It should be noted that embodiments are not limited to the sizes of PRBs, PRAs, OFDMA symbol periods and/or other elements as described in the examples herein. For instance, a PRB may include any suitable number of subcarriers, and is not limited to usage of three subcarriers. As an example, a PRB may include 12 subcarriers, and a TAS channel and/or RAS channel (such as 10 data symbols and two pilot symbols) may be mapped to a PRB during a single OFDMA symbol period. As another example, a PRB may include 4 subcarriers, and a TAS channel and/or RAS channel (such as 10 data symbols and two pilot symbols) may be mapped to a PRB during 3 OFDMA symbol periods.

In some embodiments, subframes of a frame may be allocated, by the nUE 102, as downlink frames or uplink frames for a sidelink communication between the nUE 102 and one or more wUEs 103. The allocation may be performed on a per-subframe basis, although the scope of embodiments is not limited in this respect. During the subframe(s) allocated as downlink subframes, the nUE 102 may contend for access to one or more PRBs of channel resources for per-PRB data transmissions, the contention based on per-PRB transmissions of TAS channels and per-PRB detections of RAS channels responsive to the TAS channels. During the subframe(s) allocated as uplink subframes, the nUE 102 may monitor one or more PRBs for TAS channels from one or more wUEs 103 contending for access. The nUE 102 may encode RAS channels for per-PRB transmission in response to detected TAS channels. The subframes may be allocated as downlink frames or uplink frames based at least partly on one or more factors, including but not limited to sizes of downlink data to be transmitted to the one or more wUEs 103, data rates of downlink data to be transmitted to the one or more wUEs 103, sizes of uplink data to be received from the one or more wUEs 103, data rates of uplink data to be received from the one or more wUEs 103, one or more scheduling rules, guidelines and/or procedures, one or more requests from wUE(s) 103 and/or other factors.

In some embodiments, in different subframes of a frame, the PRB(s) used and/or indicated by the nUE 102 in control channels may be different. The scope of embodiments is not limited in this respect, however, as a common set of PRBs may also be used in any number of subframes. As an example, during a first subframe, the nUE 102 may indicate that a first set of PRBs is to be used and may indicate that a second set of PRBs is to be used during a second subframe. The first and second sets may be different, may be non-overlapping, may be partly overlapping or may be the same.

Various arrangements for the subframe may be used. Referring to the non-limiting example of FIG. 6, in subchannel 635 (#0), the OFDM symbol periods of SF0 may be used for and/or allocated for a control channel 640, followed by a guard period 641 (GP1), followed by a TAS channel 642, followed by a guard period 643 (GP2), followed by a RAS channel 644, followed by a guard period 645 (GP3), followed by a DL data portion 646, followed by a guard period 647 (GP4), followed by an ACK channel 648, followed by a guard period 649 (GP5). It should be noted that during SF0, the data portion may be restricted to DL data from the nUE 102 to the wUE 103, although the scope of embodiments is not limited in this respect. Accordingly, the nUE 102 may attempt to transmit data during SF0 in this example. Therefore, the TAS 642 may be transmitted by the nUE 102, the RAS 644 may be transmitted by a wUE 102, the data may be transmitted by the nUE 102, and the ACK may be transmitted by a wUE 102.

In a non-limiting example, a first format may be used for subchannel 620 during SF0 and a second format may be used for the other subchannels (630, 635 and others) during SF0 (such as the one illustrated for subchannel 635). The scope of embodiments is not limited in this respect, however, as any suitable number of formats for the subchannels may be used during SF0.

During other subframes, including but not limited to SF6, any suitable number of formats may be used in different subchannels. In the non-limiting example of FIG. 6, a format similar to that used for subchannel 635 during SF0 is used for the subchannels 620, 630, 635 and others (that is, subchannels 0, 1, . . . . N−1). However, the data portions of the subchannels during the subframes after SF0 may be used for uplink or downlink data transmission. Accordingly, during such subframe/subchannel pairs, the TAS and data may be transmitted by the data transmitter UE. In addition, the RAS and the ACK may be transmitted by the data receiver UE.

In subchannel 635 (#0), the OFDM symbol periods of SF6 may be used for and/or allocated for a control channel 650, followed by a guard period 651 (GP1), followed by a TAS channel 652, followed by a guard period 653 (GP2), followed by a RAS channel 654, followed by a guard period 645 (GP3), followed by a DL data portion 656, followed by a guard period 657 (GP4), followed by an ACK channel 658, followed by a guard period 659 (GP5).

During a downlink subframe 700, the nUE 102 may perform the following: a transmission of a control channel 705 followed by a guard period, a transmission of a TAS channel 710 followed by another guard period, a reception of a RAS channel 715 followed by another guard period, a transmission of a data channel 720 followed by another guard period, and a reception of an ACK channel 725 followed by another guard period. A wUE 103 may perform the reciprocal operations.

During an uplink subframe 750, the wUE 103 may perform the following: a reception of a control channel 755 followed by a guard period, a transmission of a TAS channel 760 followed by another guard period, a reception of a RAS channel 765 followed by another guard period, a transmission of a data channel 770 followed by another guard period, and a reception of an ACK channel 775 followed by another guard period. An nUE 102 may perform the reciprocal operations.

Although embodiments are not limited as such, the data, control channel, TAS channel, RAS channel, and ACK channel may be or may include orthogonal frequency division multiple access (OFDMA) signals. As shown in the example 800, the control channel portion 810 may comprise four OFDMA symbol periods, the TAS portion 815 may comprise four OFDMA symbol periods, the RAS portion 820 may comprise four OFDMA symbol periods, the data portion 825 may comprise 34 OFDMA symbol periods, and the ACK portion 830 may comprise four OFDMA symbol periods. The first, second, and fifth guard periods (812, 817 and 832) may each comprise one OFDMA symbol period. The third guard period (822) may comprise one and a half OFDMA symbol periods. The fourth guard period (827) may comprise two OFDMA symbol periods. Embodiments are not limited by the sizes of the portions and/or arrangement of the elements in the example 800 of FIG. 8.

Although embodiments are not limited as such, the synchronization signal (SS), BCH, paging channels and/or discovery channels may be or may include orthogonal frequency division multiple access (OFDMA) signals. As shown in the example 850, the SS (860 and 865) may comprise two portions of four OFDMA symbol periods, the BCH portion 870 may comprise two OFDMA symbol periods, and the paging/discovery portion 875 may comprise 32 OFDMA symbol periods. The first, second, and fifth guard periods (862, 867 and 882) may each comprise one OFDMA symbol period. The third guard period (872) may comprise one and a half OFDMA symbol periods. The fourth guard period (877) may comprise two OFDMA symbol periods. Embodiments are not limited by the sizes of the portions and/or arrangement of the elements in the example 850 of FIG. 8.

Referring to FIG. 9, various PRBs 905 are illustrated during a subframe 900. In one or more of the PRBs 905, a control channel may be transmitted/received during a control portion 910 of the subframe 900. In some embodiments, a control channel may be transmitted/received in one or more PRAs (which may include one or more PRBs 905). In one or more of the PRBs 905, a TAS channel may be transmitted/received during a TAS portion 920 of the subframe 900. In one or more of the PRBs 905, a RAS channel may be transmitted/received during a RAS portion 930 of the subframe 900. In one or more of the PRBs 905, data may be transmitted/received during a data portion 940 of the subframe 900. In some embodiments, data may be transmitted/received in one or more PRAs (which may include one or more PRBs 905). In one or more of the PRBs 905, ACK bit(s), an ACK channel and/or an ACK message may be transmitted/received during an ACK portion 950 of the subframe 900. The subframe may also comprise guard portions 915, 925, 935, 945, 955.

Non-limiting examples of functionality, fields and/or parameters are given below. Embodiments are not limited to these example fields and/or parameters in terms of type, function, size and/or other aspects.

In some embodiments, a control channel may be used for one or more functions that may include, but are not limited to, DL/UL indication (whether a subframe is to be used as a downlink subframe or uplink subframe), broadcasting indication, resource indication, resource assignment for UL transmission and/or other.

The control channel for a downlink subframe may comprise a DL/UL indication of any suitable size. For instance, one bit may be repeated to produce a sequence of three bits with possible values of 000 or 111. The control channel for a downlink subframe may comprise a broadcasting resource indication. For instance, 4 bits may be used, up to 15 subchannels may be indicated, and one value (such as 1111 or other) may be reserved to indicate non-broadcasting. The control channel for a downlink subframe may comprise a cyclic redundancy check (CRC) and/or checksum. For instance, 3 bits may be used. The control channel for a downlink subframe may be scrambled by an identifier of the nUE 102. For instance, a 10 bit nUE temp ID may be used.

The control channel for an uplink subframe may comprise a DL/UL indication of any suitable size. For instance, one bit may be repeated to produce a sequence of three bits with possible values of 000 or 111. The control channel for an uplink subframe may comprise a resource indication. For instance, 4 bits may be used, up to 15 subchannels may be indicated, and one value (such as 0000 or other) may be reserved. The control channel for an uplink subframe may comprise a cyclic redundancy check (CRC) and/or checksum. For instance, 3 bits may be used. The control channel for a downlink subframe may be scrambled by an identifier of the wUE 103 that is to contend for access. For instance, a 20 bit wUE temp ID may be used.

In some embodiments, a TAS channel may be used for one or more functions that may include, but are not limited to, enablement of interference measurement for collision avoidance, resource assignment for DL transmission and/or other. The TAS channel may comprise a new data indictor (NDI) of any suitable size. For instance, one bit may be repeated to produce a sequence of 3 bits with possible values of 000 or 111. The NDI may indicate whether a data transmission (such as a corresponding data transmission for the TAS channel, a data transmission to be performed based on a contention that includes the TAS transmission and/or other data transmission) is a transmission of new data (not previously transmitted) or a retransmission of data (such as data that has been previously transmitted). The TAS channel may comprise a cyclic redundancy check (CRC) and/or checksum. For instance, 3 bits may be used. The TAS channel may be scrambled (at a symbol level) by an identifier of the wUE 103. For instance, a 20 bit wUE temp ID may be used.

In some embodiments, a RAS channel may be used for one or more functions that may include, but are not limited to, enablement of interference measurement for collision avoidance, CSI reporting, power headroom (PHR) reporting and/or other. The RAS channel may comprise a modulation and coding scheme (MCS) (such as a recommended MCS or other). For instance, 4 bits may be used. The RAS channel may comprise a DL PHR parameter. For instance, 2 bits may be used. The RAS channel may comprise a cyclic redundancy check (CRC) and/or checksum. For instance, 4 bits may be used. The RAS channel may be scrambled (at a symbol level) by an identifier of the wUE 103. For instance, a 20 bit wUE temp ID may be used.

In some embodiments, an ACK channel may be used for one or more functions that may include, but are not limited to, ACK reporting, buffer status reporting (BSR) and/or other. In a subframe that is to be used as a downlink subframe, the ACK channel may comprise one or more ACK/NACK (A/N) indicators. For instance, 2 bits may be used. In a subframe that is to be used as a downlink subframe, the ACK channel may comprise a BSR parameter. For instance, 4 bits may be used. In a subframe that is to be used as a downlink subframe, the ACK channel may comprise a cyclic redundancy check (CRC) and/or checksum. For instance, 4 bits may be used. The ACK channel may be scrambled (at a symbol level) by an identifier of the wUE 103. For instance, a 10 bit wUE temp ID may be used.

In a subframe that is to be used as an uplink subframe, the ACK channel may comprise one or more ACK/NACK (A/N) indicators. For instance, one bit may be used, and may be repeated 10 times. The ACK channel may be scrambled (at a symbol level) by an identifier of the wUE 103. For instance, a 20 bit wUE temp ID may be used.

Figure 10:
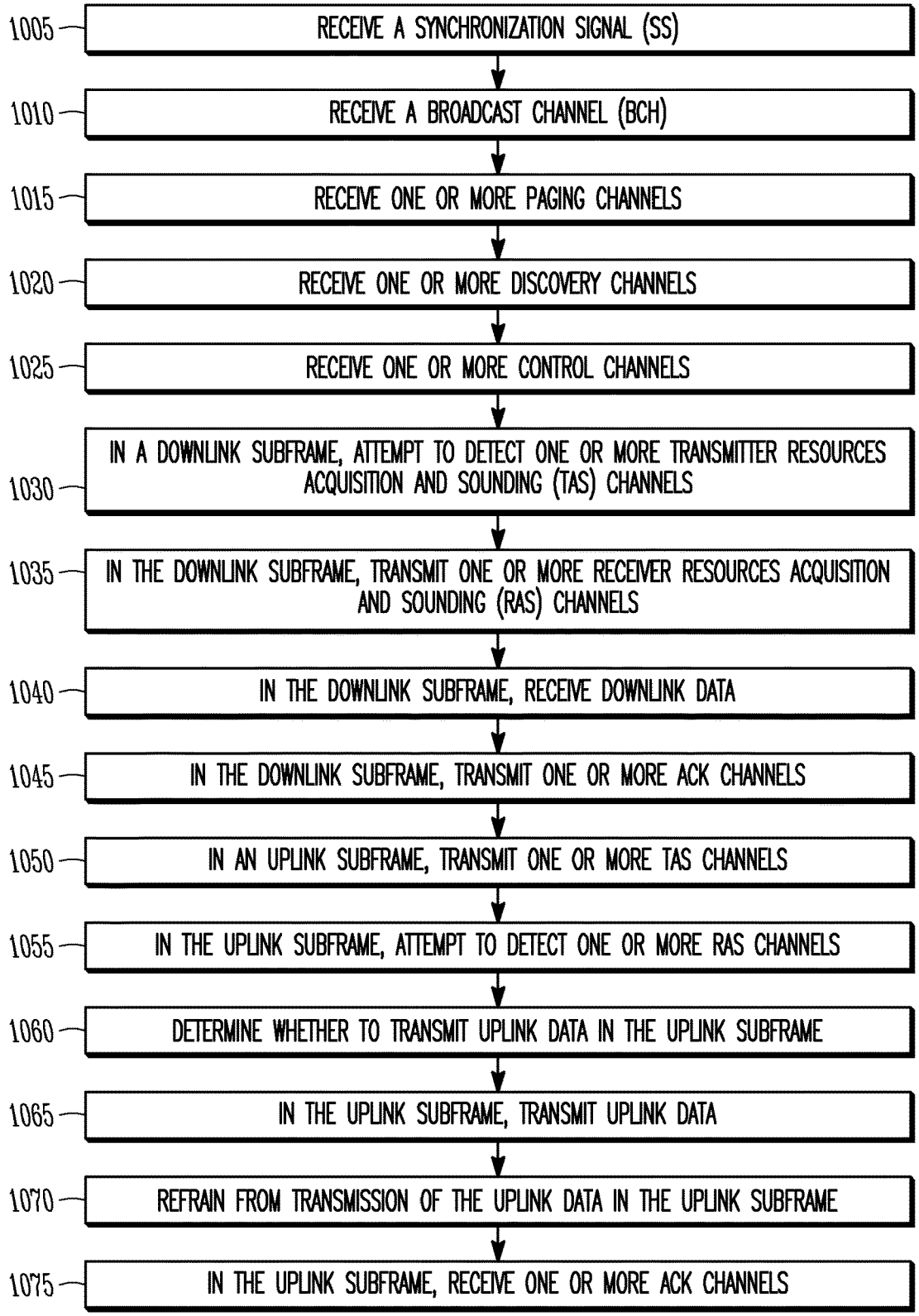
FIG. 10 illustrates the operation of another method of communication in accordance with some embodiments.

FIG. 10 illustrates the operation of another method of communication in accordance with some embodiments. As mentioned previously regarding the method 500, embodiments of the method 1000 may include additional or even fewer operations or processes in comparison to what is illustrated in FIG. 10. Embodiments of the methods 1000 are not necessarily limited to the chronological order that is shown in FIG. 10. In describing the method 1000, reference may be made to any of FIGS. 1-9 and 11, although it is understood that the method 1000 may be practiced with any other suitable systems, interfaces and components. In addition, embodiments of the method 1000 may be applicable to nUEs 102, wUEs 103, UEs, eNBs 106, STAs, APs and/or other wireless or mobile devices. The method 1000 may be applicable to an apparatus for a nUE 102, wUE 103, UE, eNB 106, STA, AP and/or other wireless or mobile device, in some embodiments.

In some embodiments, the method 1000 may be practiced by a wUE 103. In some embodiments, the method 600 may be practiced by an nUE 102. It should be noted that one or more operations of one of the methods 500 and/or 1000 may be reciprocal to, similar to and/or related to one or more operations included in the other method. As an example, an operation of the method 1000 may include reception of an element (such as a control channel and/or other element) by the wUE 103 and an operation of the method 500 may include transmission of the same element or similar element by the nUE 102.

In addition, previous discussion of various techniques and concepts may be applicable to the method 1000 in some cases, including but not limited to wUEs, nUEs, 5G NR Things, sidelink communication, SS, BCH, paging/discovery, control channel, TAS, RAS, data transmissions, ACK, contention for access to PRBs and/or channel resources, the subframe structure, the frame structure, and/or other. In addition, one or more concepts, operations and/or techniques illustrated in any of FIGS. 1-11 may be applicable to the method 1000, in some embodiments.

At operation 1005 of the method 1000, the wUE 103 may receive a synchronization signal (SS). In some embodiments, the wUE 103 may determine a reference timing for the sidelink communication based at least partly on reception of the SS. As non-limiting examples, the reference timing may be based on at least one of: one or more signals exchanged between the nUE 102 and an Evolved Node-B (eNB) 106 in a network communication, one or more signals exchanged between the nUE 102 and another nUE 102, one or more signals received at the wUE 103 from another nUE 102, a reference timing generated internally at the wUE 103 and/or a reference timing generated internally at the nUE 102. The frames and/or subframes of the sidelink communication may be aligned in accordance with the reference timing for the sidelink communication At operation 1010, the wUE 103 may receive a broadcast channel (BCH). At operation 1015, the wUE 103 may receive one or more paging channels. At operation 1020, the wUE 103 may receive one or more discovery signals. Previously described techniques and/or subframe structures may be applicable in one or more of operations 1005-1020, although the scope of embodiments is not limited in this respect.

At operation 1025, the wUE 103 may receive one or more control channels. For instance, a particular control channels may indicate, for a subframe, whether it is to be used as a downlink subframe or as an uplink subframe for communication between the wUE 103 and an nUE 102. In addition, the control channel may be scrambled by an identifier of the nUE 102, in some embodiments.

Accordingly, the wUE 103 may determine whether the subframe is to be used as a downlink subframe or uplink subframe. When the subframe is to be used as a downlink subframe, one or more of operations 1030-1045 may be performed. In addition, when the subframe is to be used as a downlink subframe, the wUE 103 may refrain from performance of operations 1050-1075 (or at least a portion of those operations).

At operation 1030, the wUE 103 may attempt to detect one or more TAS channels. The TAS channel(s) may be received from one or more nUEs 102 that intend to access the channel resources. The TAS channels may be scrambled by identifiers of wUEs 103 to which the nUE 102 intends to communicate. Accordingly, the wUE 103 may determine whether a detected TAS channel is intended for the wUE 103. For one or more TAS channels intended for the wUE 103, the wUE 103 may transmit a corresponding RAS channel at operation 1035. The RAS channel(s) may be scrambled by the identifier of the wUE 103. At operation 1040, the wUE 103 may receive downlink data. At operation 1045, the wUE 103 may transmit one or more ACK channels.

The operations 1030-1045 may be performed per PRB. For instance, the wUE 103 may monitor a particular PRB for a TAS channel, may transmit a RAS channel on the particular PRB (if the TAS channel is detected and is intended for the wUE 103), may receive downlink data on the particular PRB, and may transmit an ACK channel on the particular PRB. The wUE 103 may perform the group of operations 1030-1045 on multiple PRBs, in some cases.

In some embodiments, a TAS channel transmitted to a particular wUE 103 may be scrambled by an identifier of the particular wUE 103. In addition, a RAS channel received from a particular wUE 103 may be scrambled by the identifier of the particular wUE 103.

When the subframe is to be used as an uplink subframe, one or more of operations 1050-1075 may be performed. In addition, when the subframe is to be used as an uplink subframe, the wUE 103 may refrain from performance of operations 1030-1045 (or at least a portion of those operations).

At operation 1050, the wUE 103 may transmit one or more TAS channels. The TAS channel transmissions may indicate an intention of the wUE 103 to access channel resources for transmission of uplink data to one or more nUEs 102. The TAS channel transmissions may be performed on multiple PRBs, in some cases. TAS channel transmissions may be intended for multiple nUEs 102, in some cases.

At operation 1055, the wUE 103 may attempt to detect one or more RAS channels, which may be transmitted by nUEs 102 in response to the TAS channel(s) sent by the wUE 103. When multiple PRBs are used, the wUE 103 may attempt to detect a RAS channel in each of the multiple PRBs. In some embodiments, a TAS channel transmitted by a particular wUE 103 may be scrambled by an identifier of the particular wUE 103. In addition, a RAS channel received from the nUE 102 by a particular wUE 103 may be scrambled by the identifier of the particular wUE 103.

At operation 1060, the wUE 103 may determine whether to transmit uplink data. The determination may be based on whether RAS channel(s) are successfully detected. For instance, when a RAS channel on a particular PRB is successfully detected, the wUE 103 may transmit uplink data on the particular PRB at operation 1065. When the attempted detection of the RAS channel on the particular PRB is not successful, the wUE 103 may refrain from transmission of the uplink data on the particular PRB at operation 1070. The operations 1060, 1065, 1070 may be performed on multiple PRBs when the wUE 103 transmits multiple TAS channels on the multiple PRBs.

At operation 1075, the wUE 103 may receive one or more ACK channels. For instance, the wUE 103 may attempt to receive an ACK channel on each of the PRBs on which uplink data is transmitted by the wUE 103.

In some embodiments, the wUE 103 may receive a control channel from the nUE 102 during a subframe. The control channel may allocate the subframe as either a downlink subframe or an uplink subframe for a sidelink communication between the nUE 102 and the wUE 103. When the control channel allocates the subframe as an uplink subframe, the wUE 103 may perform one or more of the following operations: transmit a TAS channel in a PRB to contend for access to the PRB; attempt to detect a RAS channel from the nUE 102 in the PRB; determine whether to transmit data to the nUE 102 in the PRB based at least partly on whether the RAS channel from the nUE 102 is detected; transmit the data to the nUE 102 in the PRB when the RAS channel is detected; and refrain from transmission of the data to the nUE 102 in the PRB when the RAS channel is not detected. The operation(s) may be extended to multiple PRBs in accordance with per-PRB transmission and per-PRB reception.

When the control channel allocates the subframe as a downlink subframe, the wUE 103 may perform one or more of the following operations: attempt to detect a TAS channel from the nUE 102 in a PRB; when the TAS channel from the nUE 102 is detected in the PRB, encode a RAS channel for transmission to the nUE 102 in the PRB; when the TAS channel from the nUE 102 is not detected in the PRB, refrain from transmission of the RAS channel to the nUE 102; and when the TAS channel from the nUE 102 is detected in the PRB, receive data from the nUE 102 in the PRB.

Figure 12:
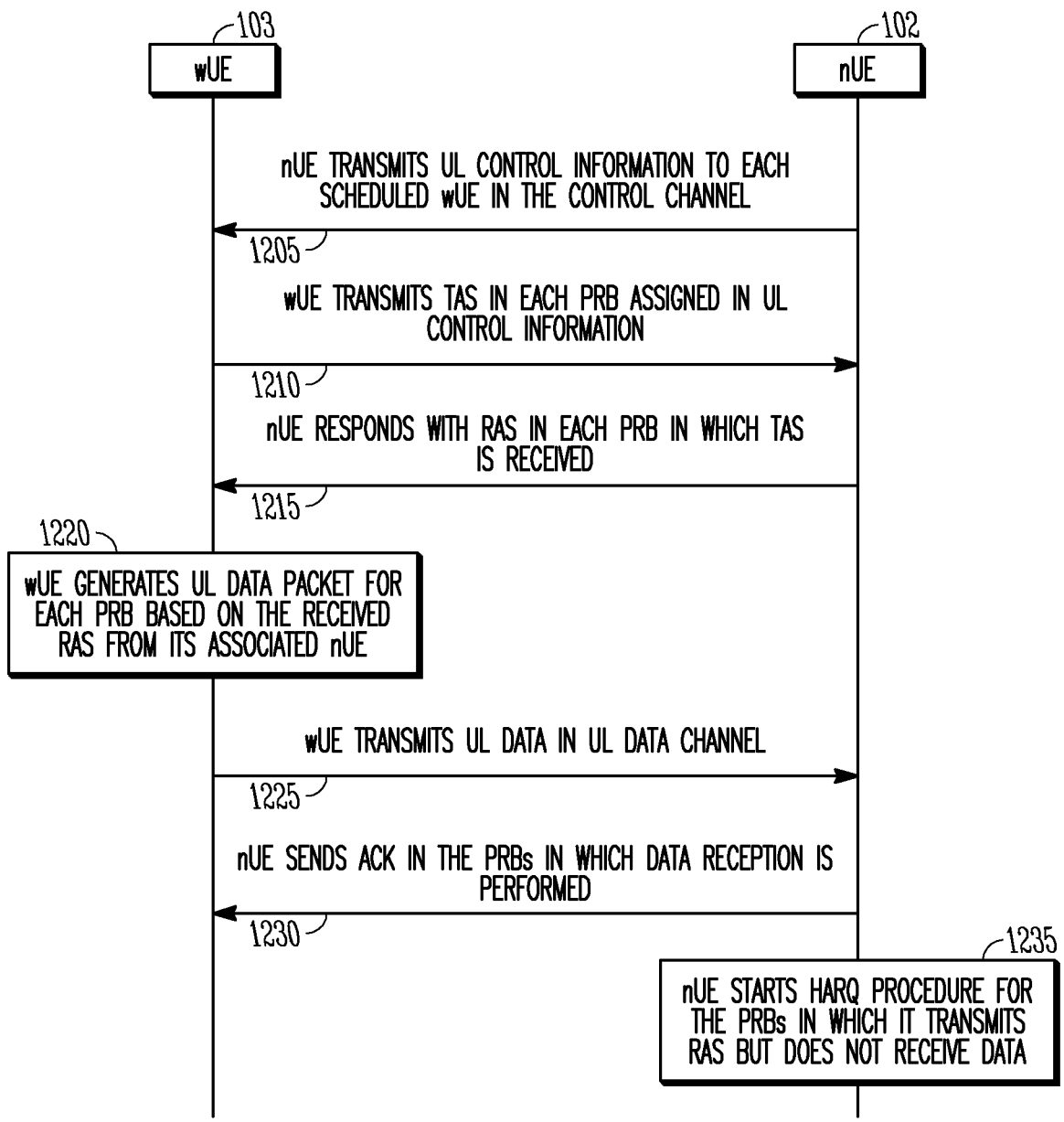
FIG. 12 illustrates example operations in accordance with some embodiments.

FIGS. 11 and 12 illustrates example operations in accordance with some embodiments. One or more of the operations illustrated in FIG. 11 may be included in a downlink data communication, such as in a downlink subframe, although the scope of embodiments is not limited in this respect. One or more of the operations illustrated in FIG. 12 may be included in an uplink data communication, such as in an uplink subframe, although the scope of embodiments is not limited in this respect. In some embodiments, an operation shown in either of FIG. 11 or FIG. 12 may be similar to, related to, the same as and/or reciprocal to an operation of method 500 and/or 1000, although the scope of embodiments is not limited in this respect.

In some embodiments, a method may include one or more operations of any of FIGS. 5, 10, 11 and/or 12. In some embodiments, additional operations not shown in any of FIGS. 5, 10, 11 and/or 12 may be included. Embodiments are not limited to chronological ordering shown in any of FIGS. 5, 10, 11 and/or 12.

In describing the operations shown in FIGS. 11 and 12, reference may be made to any of FIGS. 1-13, although it is understood that the operations of FIGS. 11 and 12 may be practiced with any other suitable systems, interfaces and components. In addition, operations shown in FIGS. 11 and 12 may be applicable to nUEs 102, wUEs 103, UEs, eNBs 106, STAs, APs and/or other wireless or mobile devices. The operations shown in FIGS. 11 and 12 may be applicable to an apparatus for a nUE 102, wUE 103, UE, eNB 106, STA, AP and/or other wireless or mobile device, in some embodiments.

In addition, previous discussion of various techniques and concepts may be applicable to the method 1000 in some cases, including but not limited to wUEs, nUEs, 5G NR Things, sidelink communication, SS, BCH, paging/discovery, control channel, TAS, RAS, data transmissions, ACK, contention for access to PRBs and/or channel resources, the subframe structure, the frame structure, and/or other. In addition, one or more concepts, operations and/or techniques illustrated in any of FIGS. 1-13 may be applicable to the operations of FIGS. 11 and 12, in some embodiments.

At operation 1105, the nUE 102 may transmit DL control information in the control channel In some embodiments, the DL control information may (and/or shall) include a DL indication for the subframe. As an example, a DL/UL indicator (or similar) may indicate that the subframe is to be used as a DL subframe. In some embodiments, the DL control information may (and/or shall) be scrambled by the nUE temp ID and may be sent in one or more PRAs (and/or one or more PRBs) generated from the nUE temp ID. In some embodiments, the primary control channel in the DL subframe may be nUE specific, and each nUE 102 may transmit one DL control message.

At operation 1110, the nUE 102 may send a TAS in each of the PRBs scheduled to each of its wUEs 103. The nUE 102 may schedule the wUEs 103 to serve in each DL subframe. The nUE 102 may schedule the PRBs for each of the served wUEs 103. A TAS may be sent in each of the scheduled PRBs to the targeted wUE 103. The TAS signal(s) may (and/or shall) be scrambled by wUE temp ID. In some embodiments, for DL broadcasting, TAS(s) may be sent in the PRBs scheduled for broadcasting (as indicated in control channel).

At operation 1115, the wUE 103 may send RAS(s) upon receiving TAS(s). In some embodiments, RAS(s) may (and/or shall) be sent in each of the PRBs in which the wUE 103 receives TAS addressed to it. The RAS signal may (and/or shall) be scrambled by wUE temp ID. In some embodiments, for DL broadcasting, the wUE 103 may refrain from transmission of RAS(s).

At operation 1120, the nUE 102 may generate a DL packet for one or more PRAs (and/or one or more PRBs) based on the received RAS(s) from the targeted wUE 103. For instance, the nUE 102 may generate the DL packet when a RAS is received on the PRB. The DL packet may be generated in accordance with an MCS and/or other parameter of the RAS, in some embodiments. In addition, the nUE 102 may refrain from generation of a DL packet and/or refrain from transmission of a DL packet on a PRA (such as a PRA that includes the PRB) when the RAS is not successfully received/detected on the PRB. The nUE 102 may schedule physical data packet(s) to be transmitted in data channel. The data packet(s) may (and/or shall) be generated based on channel state information (CSI) and/or other information received in the RAS of the PRB. In some embodiments, a MAC SDU may be generated for transmission over one or multiple PRAs. In some embodiments, a MAC SDU may be generated for transmission over one or multiple PRBs.

At operation 1125, the nUE 102 may transmit DL data in the data channel. At operation 1130, the wUE 103 may send ACK(s) in the PRA(s) and/or PRB(s) in which data reception is performed. At operation 1135, the nUE 102 may start a hybrid automatic repeat request (HARQ) procedure for the PRB(s) in which the nUE 102 transmits data but does not receive an ACK.

At operation 1205, the nUE 102 may transmit UL control information to each scheduled wUE 103 in the control channel In some embodiments, the UL control information may (and/or shall) contain a UL indication for the subframe and resource allocation information for the targeted wUE 103. As an example, a DL/UL indicator (or similar) may indicate that the subframe is to be used as a UL subframe. The UL control information may (and/or shall) be scrambled by the wUE temp ID. The primary control channel in the UL subframe may be wUE specific.

At operation 1210, the wUE 103 may transmit TAS channel(s) based on the scheduling information received in its UL control information. The TAS(s) may be sent in each of the scheduled PRBs to the serving nUE 102. The TAS signal may (and/or shall) be scrambled by wUE temp ID.

At operation 1215, the nUE 102 may transmit RAS channel(s) upon receiving TAS(s). The RAS(s) may (and/or shall) be sent in each of the PRBs in which the nUE 102 receives a TAS addressed to it. The RAS signal may (and/or shall) be scrambled by the targeted wUE temp ID.

At operation 1220, the wUE 103 may generate one or more UL packets based on the received RAS of each PRB. For instance, the wUE 103 may generate a UL packet for a particular PRA when a RAS is received on a PRB included in the PRA. The UL packet may be generated in accordance with an MCS and/or other parameter of the RAS, in some embodiments. In addition, the wUE 103 may refrain from generation of a UL packet and/or refrain from transmission of a UL packet when the RAS is not successfully received/detected. The wUE 103 may schedule physical data packet(s) to be transmitted in data channel(s). The data packet(s) may (and/or shall) be generated based on the CSI received in the RAS(s). In some embodiments, a MAC SDU may be generated for transmission over one or multiple PRAs. In some embodiments, a MAC SDU may be generated for transmission over one or multiple PRBs.

At operation 1225, the wUE 103 may transmit UL data in the data channel(s). At operation 1230, the nUE 102 may send ACK(s) in the PRB(s) in which data reception is performed. At operation 1235, the nUE 102 may start a hybrid automatic repeat request (HARQ) procedure for the PRB(s) in which the nUE 102 transmits RAS(s) data but does not receive data.

Figure 13:
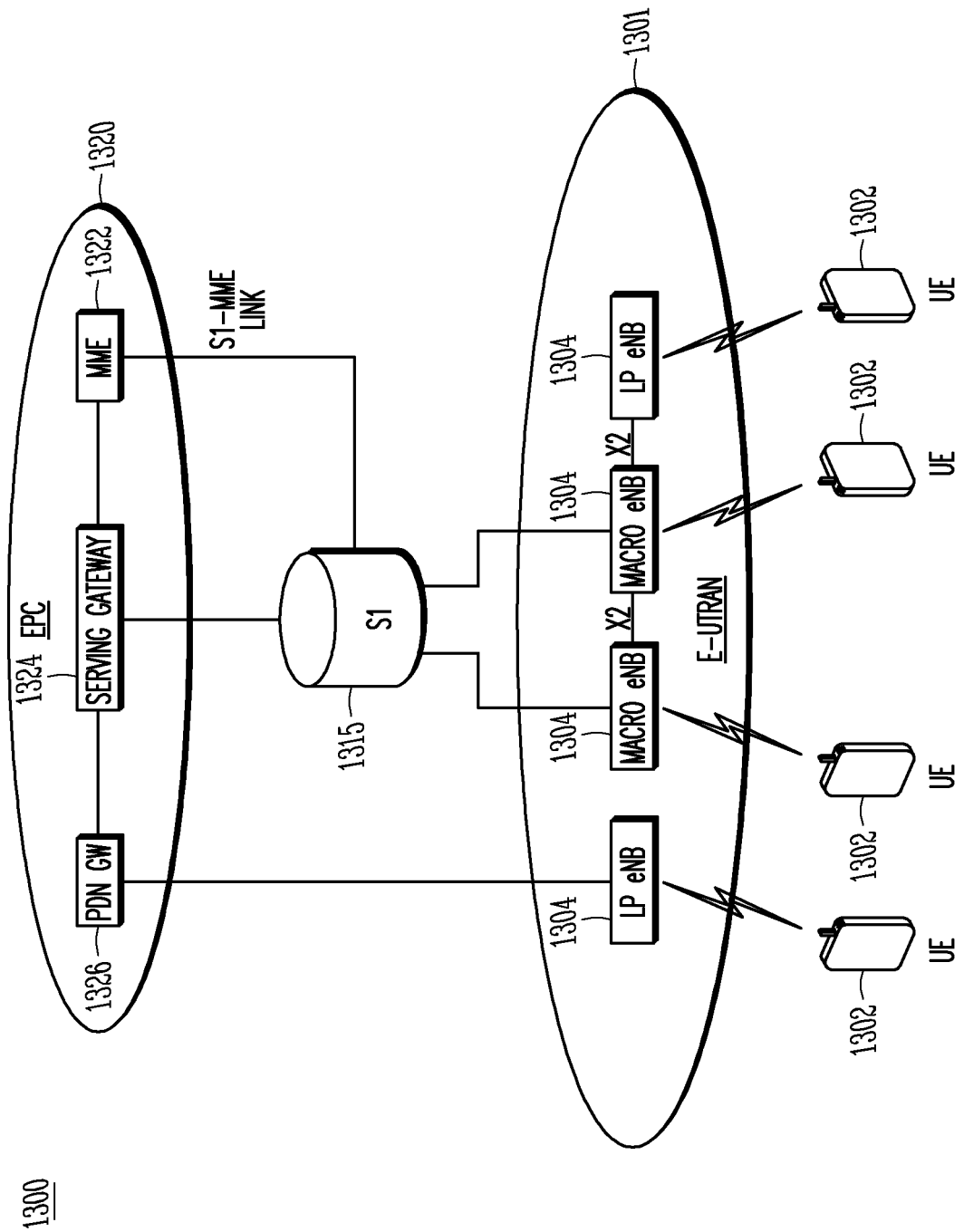
FIG. 13 is a functional diagram of a Third Generation Partnership Project (3GPP) network in accordance with some embodiments.

FIG. 13 is a functional diagram of a Third Generation Partnership Project (3GPP) network in accordance with some embodiments. In some embodiments, a mobile device (including but not limited to the wUE 102 of FIG. 1, the nUE 103 of FIG. 1 and/or the UE 1302 of FIG. 13) may be configured to communicate with multiple networks. As an example, such networks may include one or more components from one or more of the 5G-RAN 110 shown in FIG. 1, the 5G-CN 115 shown in FIG. 1, the Evolved Packet Core (EPC) network 1320 shown in FIG. 13, the Evolved Universal Terrestrial Radio Access Network (E-UTRAN) 1301 shown in FIG. 13 and/or other network. As another example, the wUE 102 and/or nUE 102 may be configured to communicate with one or more components of the 5G NR Things network 100 shown in FIG. 1 and one or more components of the 3GPP network 1300 shown in FIG. 13. As another example, one or more components of the 3GPP network 1300 shown in FIG. 13 may be similar to or the same as one or more components of the 5G NR Things network 100 shown in FIG. 1. For instance, the 5G-RAN 110 may include one or more components of the E-UTRAN network 1301. In some cases, the 5G-CN 115 may include one or more components of the EPC 1320.

It should be noted that embodiments are not limited to the example 3GPP network shown in FIG. 13, as other cellular networks and/or other networks may be used in some embodiments. As an example, a Fifth Generation (5G) network may be used in some cases. As another example, a wireless local area network (WLAN) may be used in some cases. Embodiments are not limited to these example networks, however, as other networks may be used in some embodiments. In addition, in some embodiments, one or more networks, including these example networks and/or other networks, may be used in combination. It should be noted that the networks of these embodiments and/or other embodiments may include one or more of the components shown in FIG. 1 and/or FIG. 13, and may include additional components and/or alternative components in some cases.

The 3GPP network 1300 shown in FIG. 13 may comprise a radio access network (RAN) 1301 (including but not limited to an E-UTRAN) and the core network 1320 (including but not limited to the EPC) coupled together through an S1 interface 1315. It should be noted that the S1 interface 1315 may be a link between an eNB 1304 and the MME 1322 or S-GW 1324. In addition, although multiple eNBs 1304 are illustrated in the example of FIG. 13, a separate S1 interface 1315 may be used for each eNB 1304 to provide a link between the eNB 1304 and the MME 1322 and/or S-GW 1324, in some embodiments. For convenience and brevity sake, only a portion of the core network 1320, as well as the RAN 1301, is shown.

The core network 1320 includes a mobility management entity (MME) 1322, a serving gateway (serving GW) 1324, and packet data network gateway (PDN GW) 1326. The RAN 1300 may include one or more Evolved Node-B's (eNBs) 1304 (which may operate as base stations) for communicating with User Equipment (UE) 1302. The eNBs 1304 may include macro eNBs and low power (LP) eNBs also known as micro-, pico-, femto- or small-cell eNBs.

In some embodiments, the UE 1302 may receive downlink medium access control (MAC) protocol data units (PDUs) from the eNB 1304. The MAC PDUs may be transmitted by the eNB 1304 and received by the UE 1302 in accordance with a 3GPP protocol and/or other protocol. These embodiments will be described in more detail below.

The MME 1322 is similar in function to the control plane of legacy Serving GPRS Support Nodes (SGSN). The MME 1322 manages mobility aspects in access such as gateway selection and tracking area list management. The serving GW 1324 terminates the interface toward the RAN 1301, and routes data packets between the RAN 1301 and the core network 1320. In addition, it may be a local mobility anchor point for inter-eNB handovers and also may provide an anchor for inter-3GPP mobility. Other responsibilities may include lawful intercept, charging, and some policy enforcement. The serving GW 1324 and the MME 1322 may be implemented in one physical node or separate physical nodes. The PDN GW 1326 terminates an SGi interface toward the packet data network (PDN). The PDN GW 1326 routes data packets between the EPC 1320 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 1324 may be implemented in one physical node or separated physical nodes.

The eNBs 1304 (macro and micro) terminate the air interface protocol and may be the first point of contact for a UE 1302. In some embodiments, an eNB 1304 may fulfill various logical functions for the RAN 1301 including but not limited to RNC (radio network controller functions) such as radio bearer management, uplink and downlink dynamic radio resource management and data packet scheduling, and mobility management. In accordance with embodiments, UEs 1302 may be configured to communicate Orthogonal Frequency Division Multiplexing (OFDM) communication signals with an eNB 1304 over a multicarrier communication channel in accordance with an Orthogonal Frequency Division Multiple Access (OFDMA) communication technique. The OFDM signals may comprise a plurality of orthogonal subcarriers.

The S1 interface 1315 is the interface that separates the RAN 1301 and the EPC 1320. It is split into two parts: the S1-U, which carries traffic data between the eNBs 1304 and the serving GW 1324, and the S1-MME, which is a signaling interface between the eNBs 1304 and the MME 1322. The X2 interface is the interface between eNBs 1304. The X2 interface comprises two parts, the X2-C and X2-U. The X2-C is the control plane interface between the eNBs 1304, while the X2-U is the user plane interface between the eNBs 1304.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 1326. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In Example 1, an apparatus of a network User Equipment (nUE) may comprise memory. The apparatus may further comprise processing circuitry. The processing circuitry may be configured to encode, for transmission during a subframe, a control channel that allocates the subframe as either a downlink subframe or an uplink subframe for a sidelink communication between the nUE and a wearable User Equipment (wUE). The processing circuitry may be further configured to, when the control channel allocates the subframe as a downlink subframe: encode, for transmission in a physical resource block (PRB) of channel resources comprising multiple PRBs, a transmitter resources acquisition and sounding (TAS) channel to contend for access to the channel resources; attempt to detect a receiver resources acquisition and sounding (RAS) channel from the wUE in the PRB; and determine whether to transmit data to the wUE based at least partly on whether the RAS channel from the wUE is detected. The processing circuitry may be further configured to, when the control channel allocates the subframe as an uplink subframe: attempt to detect a TAS channel from the wUE in the PRB; and when the TAS channel from the wUE is detected in the PRB, encode a RAS channel for transmission to the wUE in the PRB.

In Example 2, the subject matter of Example 1, wherein the processing circuitry may be further configured to, when the control channel allocates the subframe as a downlink subframe: when the RAS channel is detected, transmit the data to the wUE in a physical resource allocation (PRA) of one or more PRBs, including the PRB used for transmission of the TAS channel; and refrain from transmission of the data to the wUE when the RAS channel is not detected.

In Example 3, the subject matter of one or any combination of Examples 1-2, wherein the RAS channel from the wUE may indicate a modulation and coding scheme (MCS). The data may be transmitted in accordance with the indicated MCS.

In Example 4, the subject matter of one or any combination of Examples 1-3, wherein the processing circuitry may be further configured to, when the control channel allocates the subframe as an uplink subframe: when the TAS channel from the wUE is not detected in the PRB, refrain from encoding of the RAS channel for transmission to the wUE; and when the TAS channel from the wUE is detected in the PRB, decode data received from the wUE during the PRB.

In Example 5, the subject matter of one or any combination of Examples 1-4, wherein the control channel may be transmitted in a control physical resource allocation (PRA) that includes one or more PRBs. When the control channel allocates the subframe as a downlink subframe, the control PRA may be based on the nUE and the control channel is scrambled by an identifier of the nUE. When the control channel allocates the subframe as an uplink subframe, the control PRA may be based on the wUE and the control channel is scrambled by an identifier of the wUE.

In Example 6, the subject matter of one or any combination of Examples 1-5, wherein the TAS channel encoded by the nUE, the RAS channel encoded by the nUE, the TAS channel from the wUE, and the RAS channel from the wUE may be scrambled by an identifier of the wUE.

In Example 7, the subject matter of one or any combination of Examples 1-6, wherein the channel resources may comprise multiple PRBs. The processing circuitry may be further configured to, when the control channel allocates the subframe as a downlink subframe: encode a plurality of TAS channels for per-PRB transmissions in a plurality of PRBs to contend for access to the plurality of PRBs; attempt to detect RAS channels in the plurality of PRBs on a per-PRB basis; and determine whether to transmit data based on the attempted detection of the RAS channels.

In Example 8, the subject matter of one or any combination of Examples 1-7, wherein when the control channel allocates the subframe as a downlink subframe, the TAS channels may be encoded for transmission to contend for access to the channel resources for multiple data transmissions to the wUE.

In Example 9, the subject matter of one or any combination of Examples 1-8, wherein when the control channel allocates the subframe as a downlink subframe, the TAS channels may be encoded for transmission to contend for access to the channel resources for at least one data transmission to each wUE of a plurality of wUEs.

In Example 10, the subject matter of one or any combination of Examples 1-9, wherein the plurality of PRBs is a first plurality of PRBs. The processing circuitry may be further configured to, when the control channel allocates the subframe as an uplink subframe: attempt to detect a TAS channel from the wUE in each PRB of a second plurality of PRBs; and in each PRB of the second plurality on which the TAS channel is successfully detected, encode a RAS channel for transmission in the PRB.

In Example 11, the subject matter of one or any combination of Examples 1-10, wherein the control channel may include an uplink/downlink (UL/DL) indicator that indicates whether the subframe is allocated as an uplink subframe or downlink subframe. The TAS channel may include a new data indicator (NDI) that indicates whether a data transmission is a new data transmission or a retransmission. The RAS channel may include a modulation and coding scheme (MCS) and a downlink power headroom (PHR) measurement.

In Example 12, the subject matter of one or any combination of Examples 1-11, wherein the subframe may be included in a frame that comprises a plurality of subframes. The processing circuitry may be further configured to determine, on a per-subframe basis, whether the subframes of the plurality are to be used as either downlink subframes usable for transmission of downlink data from the nUE to the wUE or as uplink subframes usable for transmission of uplink data from the wUE to the nUE.

In Example 13, the subject matter of one or any combination of Examples 1-12, wherein the subframe may comprise a TAS portion allocated for per-PRB transmissions of TAS channels by nUEs and/or wUEs attempting to access the channel resources, a RAS portion allocated for per-PRB transmissions of RAS channels in response to the TAS channels, and a data portion allocated for transmissions of data based on receptions of the RAS channels.

In Example 14, the subject matter of one or any combination of Examples 1-13, wherein the processing circuitry may be further configured to determine a reference timing for the sidelink communication based on at least one of: one or more signals exchanged with an Evolved Node-B (eNB) in a network communication; one or more signals received from another nUE; or an internally generated reference timing. The subframe may be aligned in accordance with the reference timing for the sidelink communication.

In Example 15, the subject matter of one or any combination of Examples 1-14, wherein the nUE may be arranged to operate in accordance with a Fifth Generation (5G) New Radio (NR) Things protocol.

In Example 16, the subject matter of one or any combination of Examples 1-15, wherein the apparatus may further include a transceiver to transmit the control channel.

In Example 17, the subject matter of one or any combination of Examples 1-16, wherein the processing circuitry may include a baseband processor to encode the control channel.

In Example 18, a computer-readable storage medium may store instructions for execution by one or more processors to perform operations for communication by a network User Equipment (nUE). The operations may configure the one or more processors to allocate subframes of a frame as downlink frames or uplink frames for a sidelink communication between the nUE and one or more wearable User Equipment (wUE), the allocation on a per-subframe basis. The operations may further configure the one or more processors to, during the subframes allocated as downlink subframes: contend for access to channel resources for data transmissions, the channel resources comprising multiple physical resource blocks (PRBs), the contention based on per-PRB transmissions of transmitter resources acquisition and sounding (TAS) channels and per-PRB detections of receiver resources acquisition and sounding (RAS) channels responsive to the TAS channels. The operations may further configure the one or more processors to, during the subframes allocated as uplink subframes: monitor one or more PRBs for TAS channels from one or more wUEs contending for access; and encode RAS channels for per-PRB transmission in response to detected TAS channels.

In Example 19, the subject matter of Example 18, wherein the subframes may be allocated as downlink frames or uplink frames based at least partly on sizes of downlink data to be transmitted to the one or more wUEs and/or sizes of uplink data to be received from the one or more wUEs.

In Example 20, an apparatus of a wearable User Equipment (wUE) may comprise memory. The apparatus may further comprise processing circuitry. The processing circuitry may be configured to decode a control channel received from a network User Equipment (nUE) during a subframe, wherein the control channel allocates the subframe as either a downlink subframe or an uplink subframe for a sidelink communication between the nUE and the wUE. The processing circuitry may be further configured to, when the control channel allocates the subframe as an uplink subframe: encode, for transmission in a physical resource block (PRB) of channel resources that comprises multiple PRBs, a transmitter resources acquisition and sounding (TAS) channel to contend for access to the PRB; attempt to detect a receiver resources acquisition and sounding (RAS) channel from the nUE in the PRB; and determine, based at least partly on whether the RAS channel from the nUE is detected, whether to transmit data to the nUE in a physical resource allocation (PRA) of one or more PRBs, including the PRB used for the TAS channel. The processing circuitry may be further configured to, when the control channel allocates the subframe as a downlink subframe: attempt to detect a TAS channel from the nUE in the PRB; and when the TAS channel from the nUE is detected in the PRB, encode a RAS channel for transmission to the nUE in the PRB.

In Example 21, the subject matter of Example 20, wherein the processing circuitry may be further configured to, when the control channel allocates the subframe as an uplink subframe: transmit the data to the nUE when the RAS channel is detected; and refrain from transmission of the data to the nUE when the RAS channel is not detected. The processing circuitry may be further configured to, when the control channel allocates the subframe as a downlink subframe: when the TAS channel from the nUE is not detected in the PRB, refrain from encoding of the RAS channel for transmission to the nUE; and when the TAS channel from the nUE is detected in the PRB, decode data received from the nUE in a physical resource allocation (PRA) of one or more PRBs, including the PRB used for the RAS channel.

In Example 22, the subject matter of one or any combination of Examples 20-21, wherein the subframe may comprise a TAS portion allocated for per-PRB transmissions of TAS channels by nUEs and/or wUEs attempting to access the channel resources; a RAS portion allocated for per-PRB transmissions of RAS channels in response to the TAS channels; and a data portion allocated for transmissions of data based on receptions of the RAS channels.

In Example 23, the subject matter of one or any combination of Examples 20-22, wherein when the control channel allocates the subframe as a downlink subframe, the RAS channel from the wUE may indicate a downlink power headroom (PHR) measurement based on the TAS channel from the nUE detected in the PRB.

In Example 24, the subject matter of one or any combination of Examples 20-23, wherein the wUE may be arranged to operate in accordance with a Fifth Generation (5G) New Radio (NR) Things protocol.

In Example 25, the subject matter of one or any combination of Examples 20-24, wherein the apparatus may further include a transceiver to receive the control channel.

In Example 26, the subject matter of one or any combination of Examples 20-25, wherein the processing circuitry may include a baseband processor to decode the control channel.

In Example 27, an apparatus of a network User Equipment (nUE) may comprise means for allocating subframes of a frame as downlink frames or uplink frames for a sidelink communication between the nUE and one or more wearable User Equipment (wUE), the allocation on a per-subframe basis. The apparatus may further comprise means for, during the subframes allocated as downlink subframes: contending for access to channel resources for data transmissions, the channel resources comprising multiple physical resource blocks (PRBs), the contention based on per-PRB transmissions of transmitter resources acquisition and sounding (TAS) channels and per-PRB detections of receiver resources acquisition and sounding (RAS) channels responsive to the TAS channels. The apparatus may further comprise means for, during the subframes allocated as uplink subframes: monitoring one or more PRBs for TAS channels from one or more wUEs contending for access; and encoding RAS channels for per-PRB transmission in response to detected TAS channels.

In Example 28, the subject matter of Example 27, wherein the subframes may be allocated as downlink frames or uplink frames based at least partly on sizes of downlink data to be transmitted to the one or more wUEs and/or sizes of uplink data to be received from the one or more wUEs.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a network User Equipment (nUE), the apparatus comprising: a processor configured to cause the nUE to:
    encode, for transmission during a subframe, a control channel that allocates the subframe as either a downlink subframe or an uplink subframe for a sidelink communication between the nUE and a wearable User Equipment (wUE);
    when the control channel allocates the subframe as the downlink subframe:
        encode, for transmission in a physical resource block (PRB) of channel resources comprising multiple PRBs, a transmitter resources acquisition and sounding (TAS) channel to the wUE to contend for access to the channel resources;
        attempt to detect a receiver resources acquisition and sounding (RAS) channel from the wUE in the PRB; and
        determine whether to transmit data to the wUE based at least partly on whether the RAS channel from the wUE is detected;
    when the control channel allocates the subframe as the uplink subframe:
        attempt to detect a TAS channel from the wUE in the PRB; and
        when the TAS channel from the wUE is detected in the PRB, encode a RAS channel for transmission to the wUE in the PRB;
    wherein:
    the control channel is transmitted in a control physical resource allocation (PRA) that includes one or more PRBs,
    when the control channel allocates the subframe as the downlink subframe, the control PRA is based on the nUE and the control channel is scrambled by an identifier of the nUE, and
    when the control channel allocates the subframe as the uplink subframe, the control PRA is based on the wUE and the control channel is scrambled by an identifier of the wUE.

2. The apparatus according to claim 1, the processor further configured to, when the control channel allocates the subframe as the downlink subframe:
    when the RAS channel is detected, transmit the data to the wUE in a physical resource allocation (PRA) of one or more PRBs, including the PRB used for transmission of the TAS channel; and
    refrain from transmission of the data to the wUE when the RAS channel is not detected.

3. The apparatus according to claim 2, wherein:
    the RAS channel from the wUE indicates a modulation and coding scheme (MCS), and
    the data is transmitted in accordance with the indicated MCS.

4. The apparatus according to claim 1, wherein:
    the TAS channel encoded by the nUE, the RAS channel encoded by the nUE, the TAS channel from the wUE, and the RAS channel from the wUE are scrambled by an identifier of the wUE.

5. The apparatus according to claim 1, wherein: the channel resources comprise multiple PRBs, and
    the processor is further configured to, when the control channel allocates the subframe as the downlink subframe:

encode a plurality of TAS channels for per-PRB transmissions in a plurality of PRBs to contend for access to the plurality of PRBs;

attempt to detect RAS channels in the plurality of PRBs on a per-PRB basis; and determine whether to transmit data based on the attempted detection of the RAS channels.

6. The apparatus according to claim 5, wherein when the control channel allocates the subframe as the downlink subframe, the TAS channels are encoded for transmission to contend for access to the channel resources for multiple data transmissions to the wUE.

7. The apparatus according to claim 5, wherein when the control channel allocates the subframe as the downlink subframe, the TAS channels are encoded for transmission to contend for access to the channel resources for at least one data transmission to each wUE of a plurality of wUEs.

8. The apparatus according to claim 5, wherein:
the plurality of PRBs is a first plurality of PRBs,
the processor is further configured to, when the control channel allocates the subframe as the uplink subframe:
attempt to detect a TAS channel from the wUE in each PRB of a second plurality of PRBs; and
in each PRB of the second plurality on which the TAS channel from the wUE is successfully detected, encode a RAS channel for transmission in the PRB.

9. The apparatus according to claim 1, wherein:
the control channel includes an uplink/downlink (UL/DL) indicator that indicates whether the subframe is allocated as the uplink subframe or the downlink subframe,
TAS channels by nUEs and/or wUEs include a new data indicator (NDI) that indicates whether a data transmission is a new data transmission or a retransmission, and
the RAS channel includes a modulation and coding scheme (MCS) and a downlink power headroom (PHR) measurement.

10. The apparatus according to claim 1, wherein:
the subframe is included in a frame that comprises a plurality of subframes,
the processor is further configured to determine, on a per-subframe basis, whether the subframes of the plurality are to be used as either downlink subframes usable for transmission of downlink data from the nUE to the wUE or as uplink subframes usable for transmission of uplink data from the wUE to the nUE.

11. The apparatus according to claim 1, wherein the subframe comprises:
a TAS portion allocated for per-PRB transmissions of TAS channels by nUEs and/or wUEs attempting to access the channel resources,
a RAS portion allocated for per-PRB transmissions of RAS channels in response to the TAS channels, and
a data portion allocated for transmissions of data based on receptions of the RAS channels.

12. The apparatus according to claim 1, wherein:
the processor is further configured to determine a reference timing for the sidelink communication based on at least one of:
one or more signals exchanged with a base station in a network communication,
one or more signals received from another nUE, or
an internally generated reference timing, and
the subframe is aligned in accordance with the reference timing for the sidelink communication.

13. The apparatus according to claim 1, wherein the nUE is arranged to operate in accordance with a Fifth Generation (5G) New Radio (NR) Things protocol.

14. The apparatus according to claim 1, wherein the apparatus further includes a transceiver to transmit the control channel.

15. The apparatus according to claim 1, wherein the processor includes a baseband processor to encode the control channel.

16. A non-transitory computer-readable storage medium that stores instructions for execution by one or more processors to perform operations for communication by a network User Equipment (nUE), the operations to configure the one or more processors to:
allocate subframes of a frame as downlink frames or uplink frames for a sidelink communication between the nUE and one or more wearable User Equipment (wUE), the allocation on a per-subframe basis;
during the subframes allocated as downlink subframes:
contend for access to channel resources for data transmissions, the channel resources comprising multiple physical resource blocks (PRBs), the contention based on per-PRB transmissions of transmitter resources acquisition and sounding (TAS) channels and per-PRB detections of receiver resources acquisition and sounding (RAS) channels responsive to the TAS channels; and
during the subframes allocated as uplink subframes:
monitor one or more PRBs for TAS channels from one or more wUEs contending for access;
when a first TAS channel from a first wUE is not detected in the PRB, refrain from encoding of the RAS channel for transmission to the first wUE;
when a second TAS channel from a second wUE is detected in the PRB, decode data received from the second wUE during the PRB; and
encode RAS channels for per-PRB transmission in response to detected TAS channels.

17. The non-transitory computer-readable storage medium according to claim 16, wherein the subframes are allocated as downlink frames or uplink frames based at least partly on sizes of downlink data to be transmitted to the one or more wUEs and/or sizes of uplink data to be received from the one or more wUEs.

18. The non-transitory computer-readable storage medium according to claim 16, wherein the nUE is arranged to operate in accordance with a Fifth Generation (5G) New Radio (NR) Things protocol.

19. An apparatus of a wearable User Equipment (wUE), the apparatus comprising:
a processor configured to cause the wUE to:
decode a control channel received from a network User Equipment (nUE) during a subframe, wherein the control channel allocates the subframe as either a downlink subframe or an uplink subframe for a sidelink communication between the nUE and the wUE;
when the control channel allocates the subframe as the uplink subframe:
encode, for transmission in a physical resource block (PRB) of channel resources that comprises multiple PRBs, a transmitter resources acquisition and sounding (TAS) channel to the nUE to contend for access to the PRB;
attempt to detect a receiver resources acquisition and sounding (RAS) channel from the nUE in the PRB; and
determine, based at least partly on whether the RAS channel from the nUE is detected, whether to transmit data to the nUE in a physical resource allocation (PRA) of one or more PRBs, including the PRB used for the TAS channel;

when the control channel allocates the subframe as the downlink subframe:
attempt to detect a TAS channel from the nUE in the PRB; and
when the TAS channel from the nUE is detected in the PRB, encode a RAS channel for transmission to the nUE in the PRB;

wherein:

the control channel is transmitted in a control physical resource allocation (PRA) that includes one or more PRBs, when the control channel allocates the subframe as the downlink subframe, the control PRA is based on the nUE and the control channel is scrambled by an identifier of the nUE, and when the control channel allocates the subframe as the uplink subframe, the control PRA is based on the wUE and the control channel is scrambled by an identifier of the wUE.

20. The apparatus according to claim 19, wherein the wUE is arranged to operate in accordance with a Fifth Generation (5G) New Radio (NR) Things protocol.

* * * * *